(12) United States Patent
Dai et al.

(10) Patent No.: US 11,573,401 B2
(45) Date of Patent: Feb. 7, 2023

(54) OPTICAL IMAGING SYSTEM COMPRISING SEVEN LENSES OF +−−+−+−, +−++−+−, +−−−++− OR +−−−+++− REFRACTIVE POWERS

(71) Applicant: Zhejiang Sunny Optical Co., Ltd, Ningbo (CN)

(72) Inventors: Fujian Dai, Ningbo (CN); Lin Huang, Ningbo (CN); Yunbing Ji, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 177 days.

(21) Appl. No.: 16/689,190

(22) Filed: Nov. 20, 2019

(65) Prior Publication Data

US 2021/0055514 A1   Feb. 25, 2021

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 2019/0227277 A1* | 7/2019 | Tang | G02B 13/0045 |
| 2019/0361196 A1* | 11/2019 | Chang | G02B 13/008 |
| 2019/0377161 A1* | 12/2019 | Lin | G02B 13/0045 |
| 2020/0073085 A1* | 3/2020 | Huang | G02B 13/0045 |
| 2020/0209546 A1* | 7/2020 | Zhao | G02B 9/64 |
| 2020/0209592 A1* | 7/2020 | Bian | G02B 13/0045 |
| 2021/0048634 A1* | 2/2021 | Sun | G02B 9/64 |
| 2021/0063696 A1* | 3/2021 | Kamada | G02B 27/0081 |

* cited by examiner

*Primary Examiner* — Wen Huang
(74) *Attorney, Agent, or Firm* — Sughrue Mion, PLLC

(57) ABSTRACT

The application discloses an optical imaging system. The system sequentially comprises the following components from an object side to an image side along an optical axis: a first lens having refractive power, an image side surface of which is a convex surface; a second lens having negative refractive power; a third lens having refractive power, the image side surface of which is a concave surface; a fourth lens having refractive power; a fifth lens having refractive power, the object side surface of which is a convex surface; a sixth lens with positive refractive power, the object side surface of which is a convex surface; a seventh lens having refractive power; an effective focal length f of the optical imaging system and an entrance pupil diameter EPD of the optical imaging system meet the condition that f/EPD is less than 2; the effective focal length f of the optical imaging system, an effective focal length f1 of the first lens, and an effective focal length f2 of the second lens satisfy $0.1 < f/|f1+f2| < 1.5$.

8 Claims, 11 Drawing Sheets

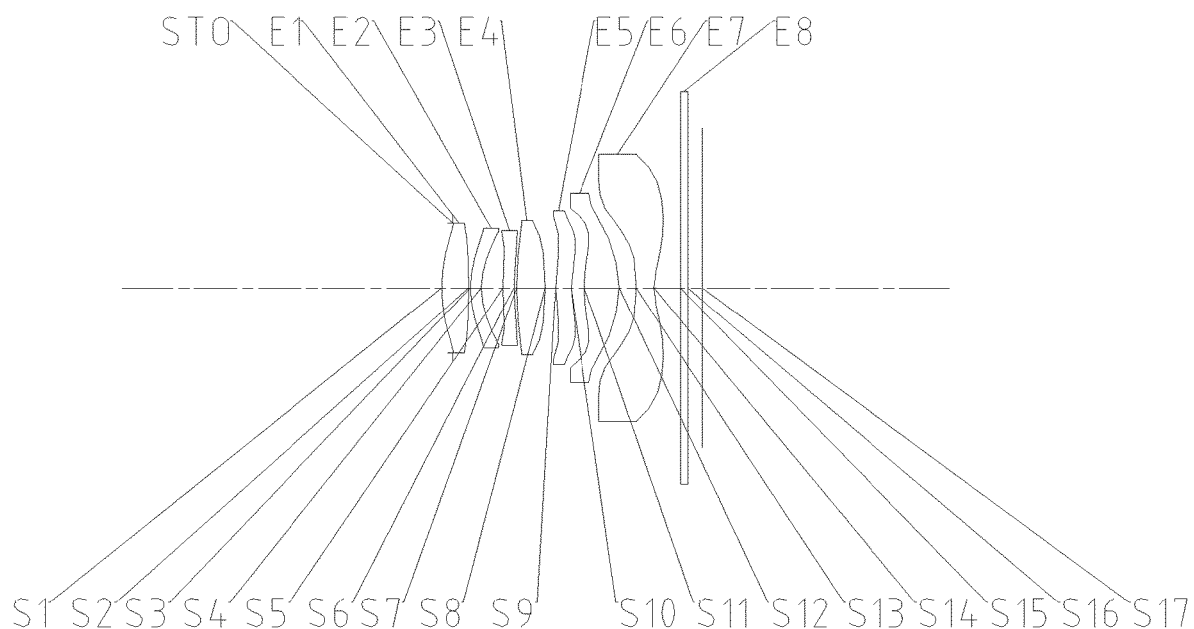
Fig.1
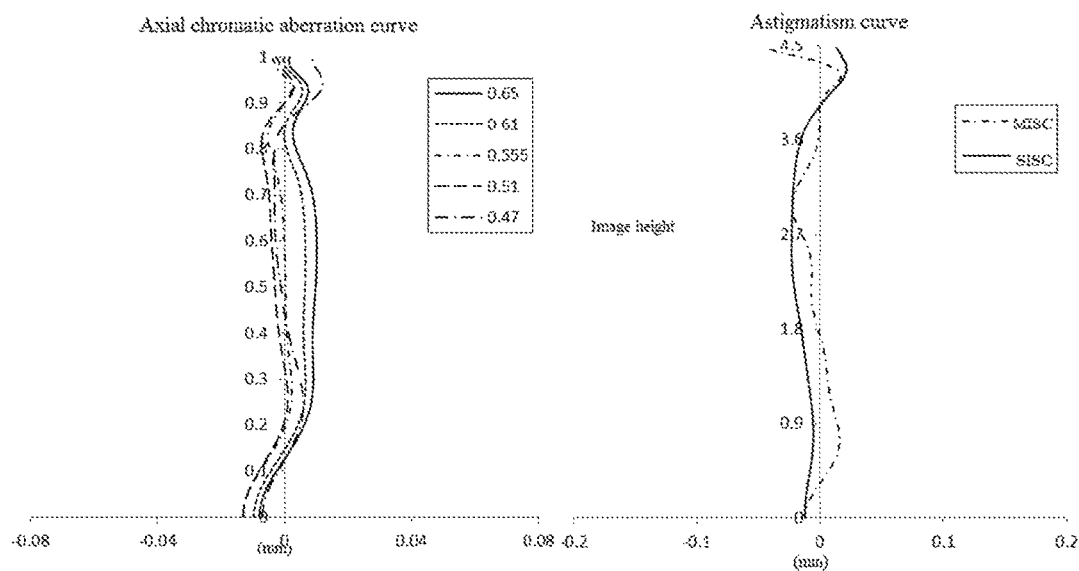
Fig.2A                    Fig.2B

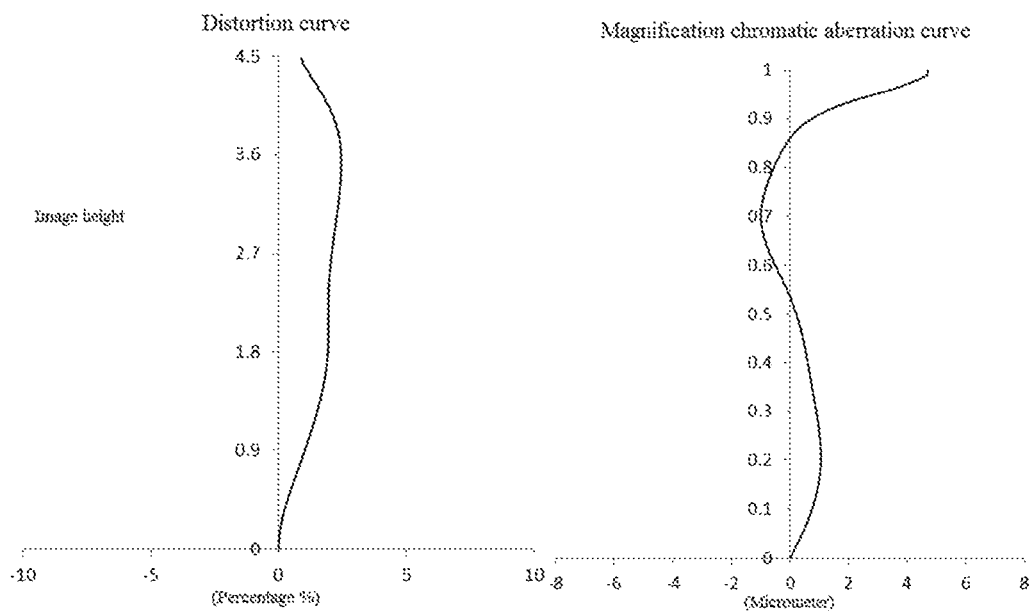
Fig.2C
Fig.2D
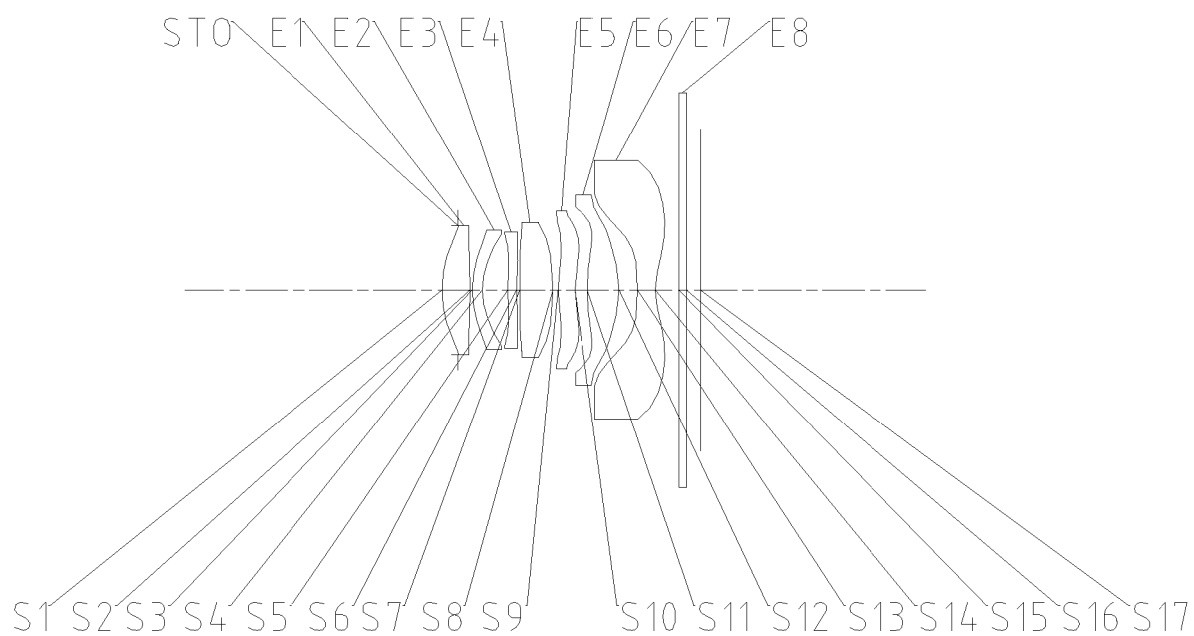
Fig.3

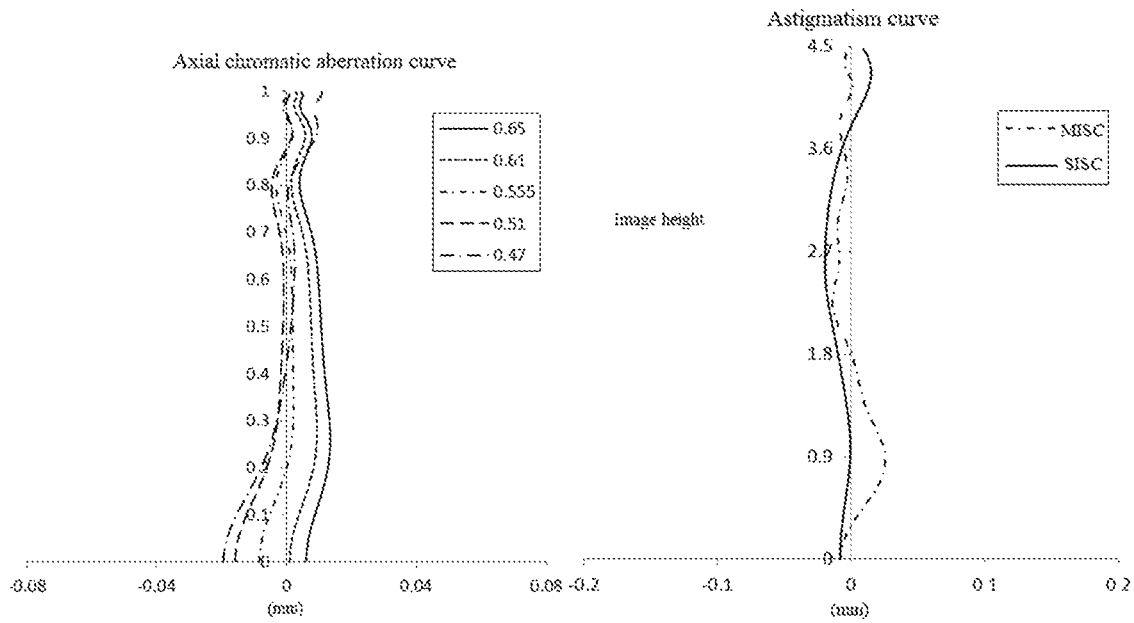
Fig.4A                    Fig.4B
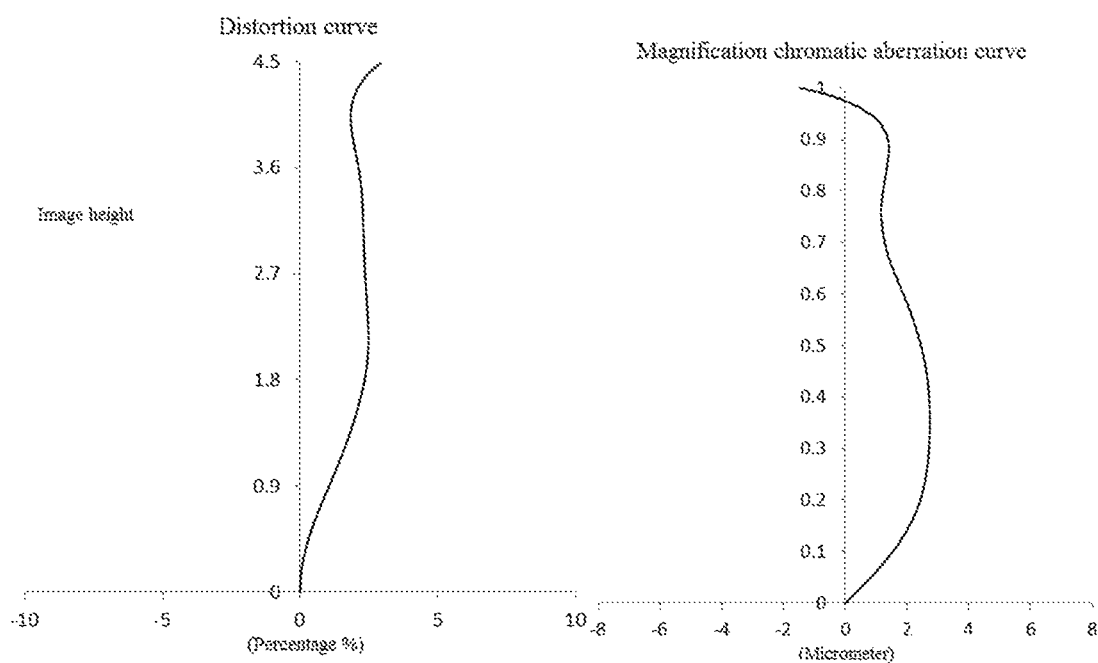
Fig.4C                    Fig.4D

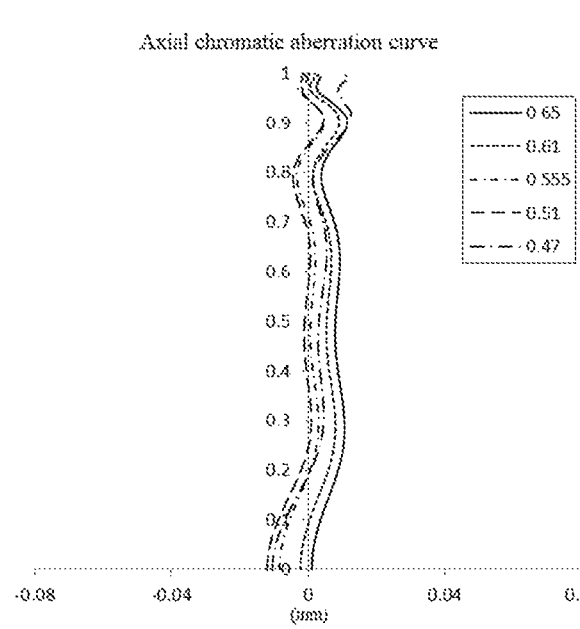
Fig.8A
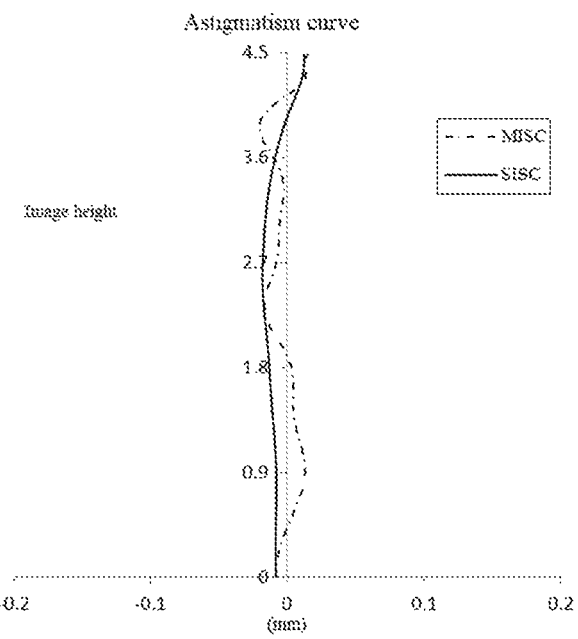
Fig.8B
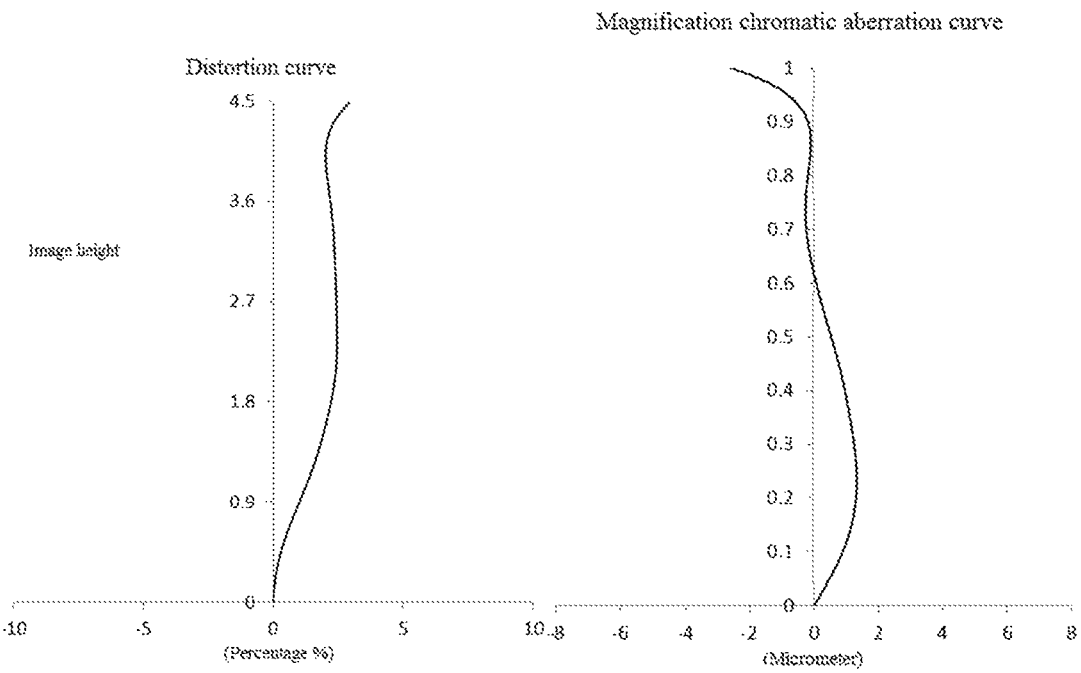
Fig.8C
Fig.8D

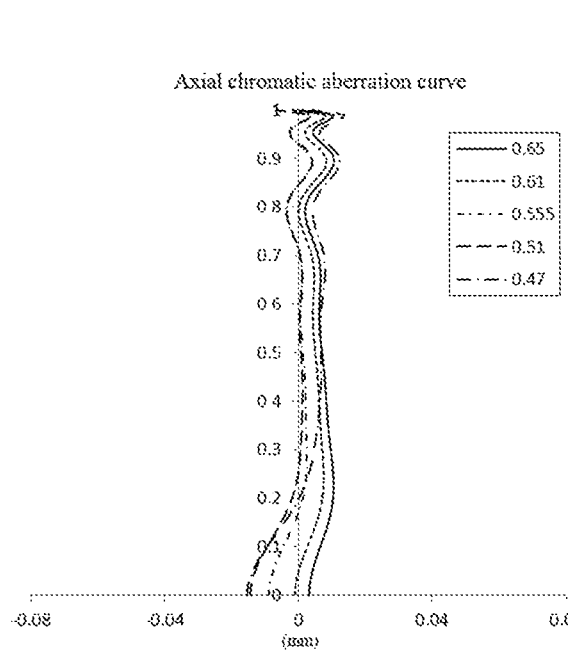
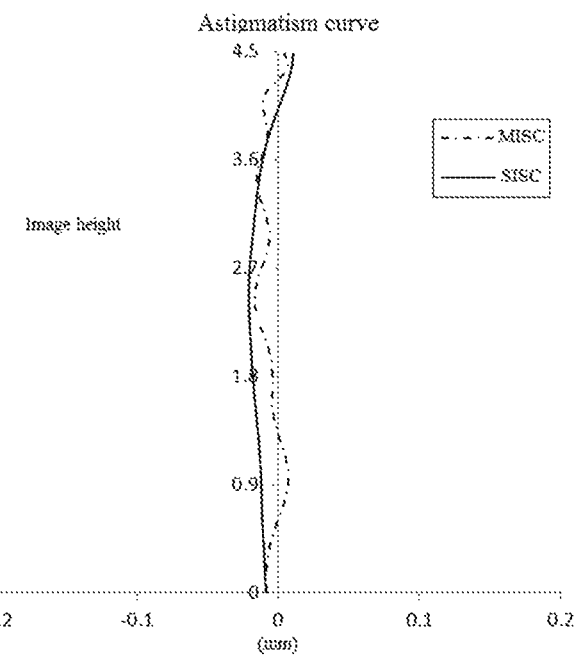
Fig.12A  Fig.12B
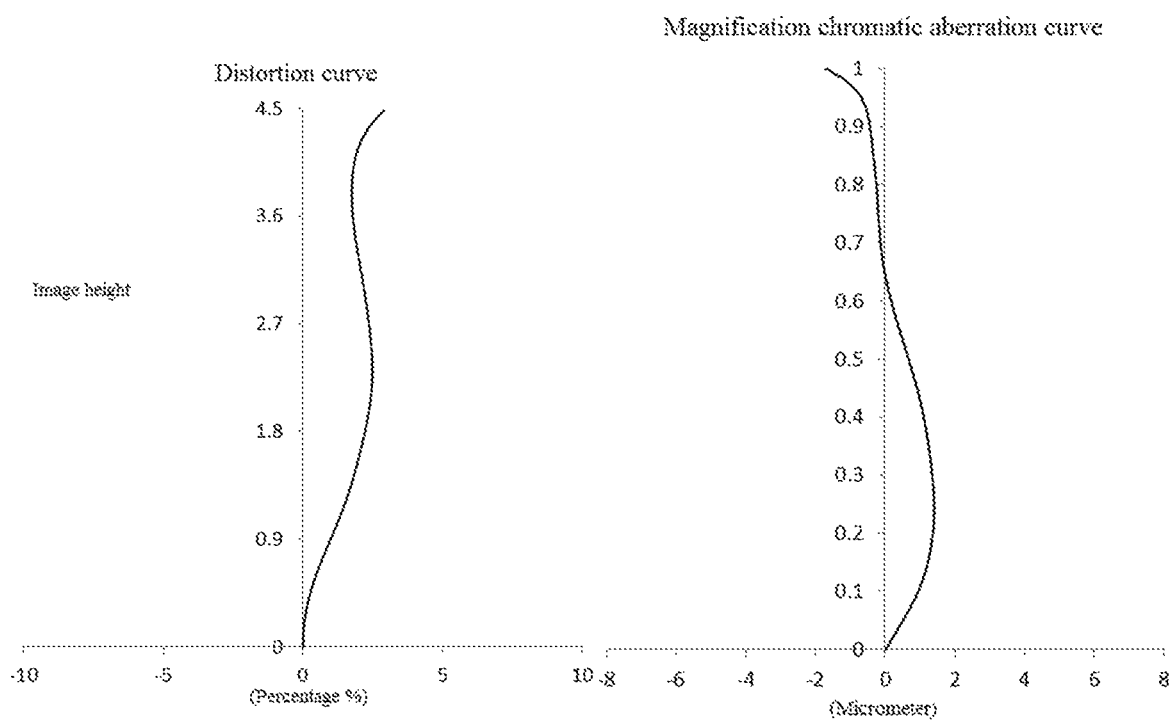
Fig.12C  Fig.12D

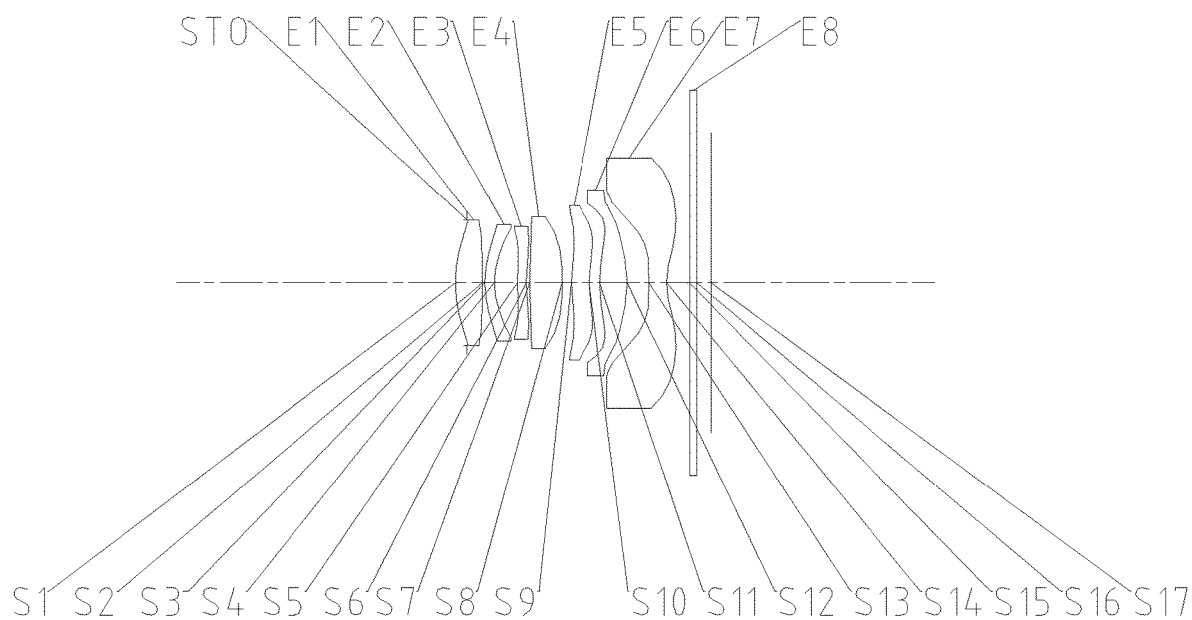
Fig.13
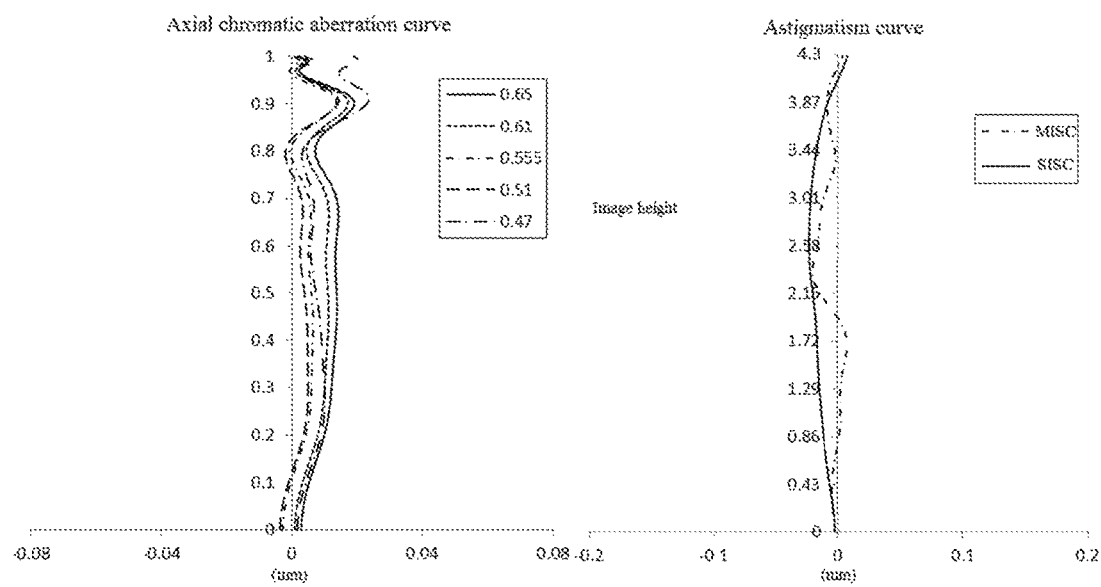
Fig.14A
Fig.14B

OPTICAL IMAGING SYSTEM COMPRISING SEVEN LENSES OF +−−+−+−, +−++−+−, +−−−++− OR +−−+++−REFRACTIVE POWERS

TECHNICAL FIELD

The present application relates to an optical imaging system, and more particularly, to an optical imaging system comprising seven lenses.

BACKGROUND

In recent years, with the upgrading of portable electronic products and the development of image software functions and video software functions on the portable electronic products, the market demand for optical imaging systems suitable for the portable electronic products has been gradually increased.

In order to meet the demand for miniaturization and meet the demand for imaging, there is a need for an optical imaging system capable of achieving miniaturization, high pixel, high resolution, and bright field of view.

SUMMARY

The present application provides an optical imaging system applicable to portable electronic products and may at least address or partially address at least one of the above-identified shortcomings in the prior art.

The present application provides an optical imaging system sequentially comprising the following components from an object side to an image side along an optical axis: a first lens having refractive power, an image side surface of which may be a convex surface; a second lens having negative refractive power; a third lens having refractive power; a fourth lens having refractive power; a fifth lens having refractive power, an object side surface of which may be a convex surface; a sixth lens having refractive power, an object side surface of which may be a convex surface; and a seventh lens having refractive power.

In one embodiment, the image side surface of the third lens may be a concave surface. In one embodiment, the sixth lens may have positive refractive power.

In one embodiment, an effective focal length f of the optical imaging system and an entrance pupil diameter EPD of the optical imaging system may satisfy f/EPD<2.

Further, the effective focal length f of the optical imaging system and the entrance pupil diameter EPD of the optical imaging system can satisfy f/EPD<1.5.

In one embodiment, the effective focal length f of the optical imaging system, the effective focal length f1 of the first lens, and the effective focal length f2 of the second lens may satisfy 0.1<f/|f1+f2|<1.5.

In one embodiment, Semi-FOV (half of field of view) of the optical imaging system and the effective focal length f6 of the sixth lens may satisfy 2.48 mm≤tan (Semi-FOV)× |f6|<3.6 mm.

In one embodiment, ImgH (half of a diagonal length of an effective pixel area on an imaging plane) of the optical imaging system and a combined focal length f12 of the first lens and the second lens may satisfy 0.3<ImgH/f12<0.6.

In one embodiment, an effective focal length f of the optical imaging system and a curvature radius R2 of an image side surface of the first lens satisfy −0.43 f/R2<0.

In one embodiment, a space distance T12 between the first lens and the second lens on the optical axis and a space distance T34 between the third lens and the fourth lens on the optical axis satisfy 0<T12/T34<0.9.

In one embodiment, a space distance between the second lens and the third lens on the optical axis, a center thickness CT2 of the second lens on the optical axis, and a center thickness CT3 of the third lens on the optical axis satisfy 1.02≤T23/(CT2+CT3)<1.6.

In one embodiment, a center thickness CT1 of the first lens on the optical axis, a center thickness CT4 of the fourth lens on the optical axis, a center thickness CT6 of the sixth lens on the optical axis, and a sum of center thicknesses ΣCT of the first lens to the seventh lens on the optical axis satisfy 0.3<(CT1+CT4+CT6)/ΣCT<0.8.

In one embodiment, a distance TTL from the first lens to an imaging surface of the optical imaging system on the optical axis, a curvature radius R5 of an object side surface of the third lens, and a curvature radius R6 of an image side surface of the third lens satisfy 0.2<TTL/(R5+R6)<1.

In one embodiment, a curvature radius R9 of an object side surface of the fifth lens, and a curvature radius R11 of an object side surface of the sixth lens, satisfy 0<R9/R11<1.

In one embodiment, a center thickness CT1 of the first lens and the center thickness CT4 of the fourth lens satisfy 0.4<CT1/CT4≤1.05.

In one embodiment, an on-axis distance SAG 12 from an intersection of the image side surface of the first lens and the optical axis to an effective radius vertex of the image side surface of the first lens and an on-axis distance SAG 42 from an intersection of the image side surface of the fourth lens and the optical axis to an effective radius vertex of the image side surface of the fourth lens satisfy 0<SAG 12/SAG 42<0.5.

According to the application, seven lenses are adopted, and the refractive power, the surface type, the center thickness of each lens, the on-axis distance between the lenses and the like are reasonably distributed, so that the optical imaging system has at least one advantages of miniaturization, high pixel, high resolution, bright field and the like.

BRIEF DESCRIPTION OF THE DRAWINGS

Other features, objects and advantages of the present application will become more apparent from the following detailed description of non-limiting embodiments, taken in conjunction with the accompanying drawings. In the drawings:

FIG. 1 shows a schematic structural diagram of an optical imaging system according to embodiment 1 of the present application; and FIG. 2A to 2D show an axial chromatic aberration curve, an astigmatism curve, a distortion curve, and a magnification chromatic aberration curve, respectively, of the optical imaging system of embodiment 1;

FIG. 3 shows a schematic structural diagram of an optical imaging system according to embodiment 2 of the present application; and FIG. 4A to 4D show an axial chromatic aberration curve, an astigmatism curve, a distortion curve, and a magnification chromatic aberration curve, respectively, of the optical imaging system of embodiment 2;

FIG. 8A to 8D show an axial chromatic aberration curve, an astigmatism curve, a distortion curve, and a magnification chromatic aberration curve, respectively, of the optical imaging system of embodiment 4;

FIG. 12A to 12D show an axial chromatic aberration curve, an astigmatism curve, a distortion curve, and a magnification chromatic aberration curve, respectively, of the optical imaging system of embodiment 6;

FIG. 13 shows a schematic structural diagram of an optical imaging system according to embodiment 7 of the present application; and FIG. 14A to 14D show an axial chromatic aberration curve, an astigmatism curve, a distortion curve, and a magnification chromatic aberration curve, respectively, of the optical imaging system of embodiment 7.

DETAILED DESCRIPTION OF THE EMBODIMENTS

Figure 5:
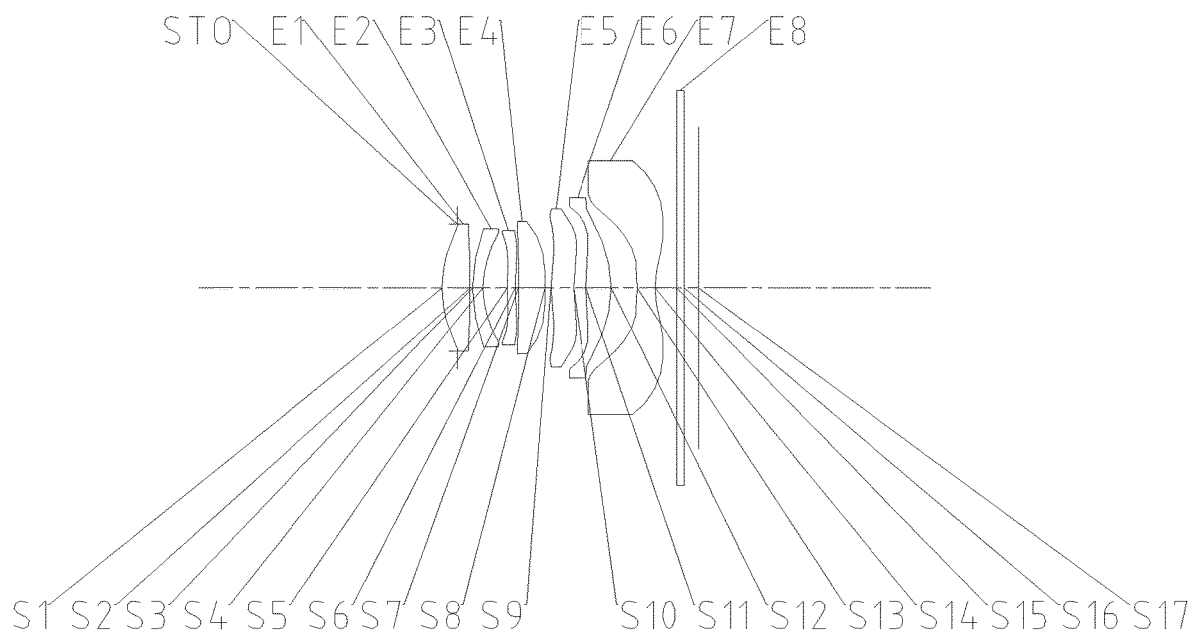
FIG. 5 shows a schematic structural diagram of an optical imaging system according to embodiment 3 of the present application.

For a better understanding of the present application, various aspects of the present application will be described in more detail with reference to the accompanying drawings. It should be understood that the detailed description is merely a description of exemplary embodiments of the present application and is not intended to limit the scope of the present application in any way. Throughout the specification, like reference numerals refer to like elements. The expression "and/or" includes any and all combinations of one or more of the associated listed items.

It should be noted that in the specification, the expressions "first", "second", "third" and the like are used only to distinguish one feature from another and do not indicate any limitation to the features. Thus, the first lens discussed below may also be referred to as a second lens or a third lens without departing from the teachings of the present application.

In the drawings, the thicknesses, sizes and shapes of the lenses have been slightly exaggerated for convenience of explanation. Specifically, the shapes of the spherical or aspherical surfaces shown in the drawings are shown by way of example. That is, the shape of the spherical surface or the aspherical surface is not limited to the shape of the spherical surface or the aspherical surface shown in the drawings. The drawings are exemplary only and are not necessarily to scale.

In the context, the paraxial region refers to a region near the optical axis. If the lens surface is convex and the position of the convex is not defined, it means that the lens surface is convex at least in the paraxial region; and if the lens surface is concave and the concave position is not defined, it means that the lens surface is concave at least in the paraxial region. The surface of each lens closest to the subject is referred to as the object side surface of the lens, and the surface of each lens closest to the imaging plane is referred to as the image side surface of the lens.

It will be further understood that the terms "comprises," "comprising," "has,"" "includes," and/or "including," when used in the specification, specify the presence of stated features, elements, and/or components, but do not preclude the presence or addition of one or more other features, elements, components, and/or groups thereof. Furthermore, when an expression, such as "at least one of the . . . " appears after a list of listed features, the entire listed feature is modified rather than individual elements of the list. Furthermore, when embodiments of the present application are described, "may" is used to mean "one or more embodiments of the present application". Also, the term "exemplary" is intended to mean serving as an example or illustration.

Unless otherwise defined, all terms (including technical and scientific terms) used herein have the same meaning as commonly understood by one of ordinary skill in the art to which the application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments and the features in the embodiments in the present application can be combined with each other without conflict. The present application will now be described in detail with reference to the accompanying drawings in conjunction with the embodiments.

The features, principles, and other aspects of the present application are described in detail below.

The optical imaging system according to an exemplary embodiment of the present application may comprise, for example, seven lenses having refractive power, i.e., a first lens, a second lens, a third lens, a fourth lens, a fifth lens, a sixth lens, and a seventh lens. The seven lenses are sequentially arranged from an object side to an image side along an optical axis. In the first lens to the seventh lens, any two adjacent lenses may have an air space therebetween.

In an exemplary embodiment, the first lens has positive refractive power or negative refractive power, and the image side surface thereof may be a convex surface; the second lens may have negative refractive power; the third lens has positive refractive power or negative refractive power, and the image side surface thereof can be a concave surface; the fourth lens has positive refractive power or negative refractive power; the fifth lens has positive refractive power or negative refractive power, and the object side surface thereof can be a convex surface; the sixth lens may have positive refractive power, and the object side surface thereof may be a convex surface; and the seventh lens has positive refractive power or negative refractive power. The low-order aberration of the control system is effectively balanced by reasonably controlling the positive and negative distribution of the refractive power of each component of the system and the surface curvature of the lenses.

In an exemplary embodiment, the sixth lens may have positive refractive power.

In an exemplary embodiment, the image side surface of the third lens may be a concave surface.

In an exemplary embodiment, the optical imaging system of the present application may satisfy the conditional expression of $f/EPD<2$, where f is an effective focal length of the optical imaging system and EPD is an entrance pupil diameter of the optical imaging system. In an exemplary embodiment, f and EPD may satisfy $f/EPD<1.5$. More specifically, f and EPD may satisfy $1.40<f/EPD<1.48$. By controlling the ratio of the effective focal length to the entrance pupil diameter of the optical imaging system, the light flux of the optical imaging system can be improved, and the optical imaging system has a large aperture, so that the aberration of the edge field of view of the optical imaging system can be reduced, and the imaging effect of the optical imaging system in a dark environment can be enhanced.

In an exemplary embodiment, the optical imaging system of the present application may satisfy the conditional expression of $0.1<f/|f1+f2|<1.5$, where f is an effective focal length of the optical imaging system, f1 is an effective focal length of the first lens, and f2 is an effective focal length of the second lens. More specifically, f, f1, and f2 may satisfy $0.50<f/|f1+f2|<1.10$. By controlling the sum of the refractive power of the first lens and the refractive power of the second lens to be matched with the effective focal length of the optical imaging system, the aberration of the optical imaging system is well balanced, and the resolving power of the optical imaging system is improved.

In an exemplary embodiment, the optical imaging system of the present application may satisfy the conditional expression of $2.48$ mm$\leq$tan (Semi-FOV)$\times|f6|<3.6$ mm, where Semi-FOV is half of field of view of the optical imaging system and f6 is the effective focal length of the sixth lens. More specifically, the Semi-FOV and f6 may satisfy $2.48$ mm$\leq$tan(Semi-FOV)$\times|f6|<3.3$ mm By controlling the maximum half field angle and the effective focal length of the sixth lens, the aberration of the optical imaging system is balanced, and the resolving power of the optical imaging system is improved.

In an exemplary embodiment, the optical imaging system of the present application may satisfy the conditional expression of $0.3<ImgH/f12<0.6$, where ImgH is half of a diagonal length of an effective pixel area on an imaging plane of the optical imaging system, and f12 is a combined focal length of the first lens and the second lens. More specifically, ImgH and f12 satisfy $0.4<ImgH/f12<0.5$. By controlling the ratio of the image height of the optical imaging system to the combined focal length of the first lens and the second lens, the aberration of the optical imaging system is balanced, and the resolving power of the optical imaging system is improved.

In an exemplary embodiment, the optical imaging system of the present application may satisfy the conditional expression of $-0.43\leq f/R2<0$, where f is an effective focal length of the optical imaging system, and R2 is a curvature radius of the image side surface of the first lens. By controlling the ratio of the effective focal length of the optical imaging system to the curvature radius of the image side surface of the first lens, the bending degree of the light ray at the image side surface of the first lens is reduced, and the astigmatism of the optical imaging system is reduced.

In an exemplary embodiment, the optical imaging system of the present application may satisfy the conditional expression of $0<T12/T34<0.9$, where T12 is a space distance between the first lens and the second lens on the optical axis, and T34 is a space distance between the third lens and the fourth lens on the optical axis. More specifically, T12 and T34 satisfy $0.2<T12/T34<0.85$. By controlling the distance between the first lens and the second lens on the optical axis and the distance between the third lens and the fourth lens on the optical axis, the optical imaging system has better processing characteristics and assembling characteristics, is beneficial to avoiding the phenomenon of interference of adjacent lenses in the assembling process, to reducing the deflection degree of light rays in the optical imaging system, to adjusting the field curvature of the optical imaging system, and to reducing the sensitivity of the optical imaging system, and further enables the optical imaging system to have better imaging quality.

In an exemplary embodiment, the optical imaging system of the present application may satisfy the conditional expression of $1.02\leq T23/(CT2+CT3)<1.6$, where T23 is a space distance between the second lens and the third lens on the optical axis, CT2 is a center thickness of the second lens on the optical axis, and CT3 is a center thickness of the third lens on the optical axis. More specifically, T23, CT2 and CT3 satisfy $1.02\leq T23/(CT2+CT3)<1.4$. By controlling the air spacing distance between the second lens and the third lens and the respective center thicknesses of the second lens and the third lens, it is favorable for the optical imaging system to have good imaging quality, and in addition, it is favorable for the optical imaging system to have good assembly stability.

In an exemplary embodiment, the optical imaging system of the present application may satisfy the conditional expression of $0.3<(CT1+CT4+CT6)/\Sigma CT<0.8$, where CT1 is a center thickness of the first lens on the optical axis, CT4 is a center thickness of the fourth lens on the optical axis, CT6 is a center thickness of the sixth lens on the optical axis, and CT is a sum of center thicknesses of the first lens to the seventh lens on the optical axis, respectively. More specifically, CT1, CT4, CT6, and CT can satisfy $0.5<(CT1+CT4+CT6)/\Sigma CT<0.7$. By controlling the sum of the center thickness of the first lens, the center thickness of the fourth lens and the center thickness of the sixth lens, the imaging quality of the optical imaging system is improved, and the miniaturization of the optical imaging system is facilitated.

In an exemplary embodiment, the optical imaging system of the present application may satisfy the conditional expression of $0.2<TTL/(R5+R6)<1$, where TTL is a distance from the first lens to an imaging surface of the optical imaging system on the optical axis, R5 is a curvature radius of an object side surface of the third lens, and R6 is a curvature radius of an image side surface of the third lens. More specifically, TTL, R5, and R6 satisfy $0.40<TTL/(R5+R6)<0.83$. The curvature radius of the mirror surfaces on the two sides of the third lens is matched with the total optical length of the optical imaging system, so that the bending degree of light rays at the position of the third lens is reduced, and the astigmatism of the optical imaging system can be effectively controlled.

In an exemplary embodiment, the optical imaging system of the present application may satisfy the conditional expression of $0<R9/R11<1$, where R9 is a curvature radius of the object side surface of the fifth lens, and R11 is a curvature radius of the object side surface of the sixth lens. More specifically, R9 and R11 satisfy $0.3<R9/R11<0.8$. By controlling the ratio of the curvature radius of the object side surface of the fifth lens to the curvature radius of the sixth lens, the shape of the fifth lens can be prevented from being excessively bent, the manufacturability of the processing and forming of the fifth lens can be improved, and the aberration of the optical imaging system can be reduced.

In an exemplary embodiment, the optical imaging system of the present application may satisfy the conditional expression of $0.4<CT1/CT4\leq 1.05$, where CT1 is a center thickness of the first lens on the optical axis, and CT4 is a center thickness of the fourth lens on the optical axis. More specifically, CT1 and CT4 satisfy $0.70<CT1/CT4\leq 1.05$. By controlling the ratio of the center thickness of the first lens to the center thickness of the fourth lens, the optical imaging system can have good imaging quality, and the optical imaging system can be stabilized at the time of assembly. Further, when the optical imaging system further meets the conditional expression of $0.3<(CT1+CT4+CT6)/\Sigma CT<0.8$, the imaging quality of the optical imaging system is improved. Furthermore, when the optical imaging system also meets the condition of 1.02≤T23/(CT2+CT3)<1.6, the assembly stability of the optical imaging system is improved.

In an exemplary embodiment, the optical imaging system of the present application may satisfy the conditional expression of 0<SAG12/SAG42<0.5, where SAG12 is an on-axis distance from an intersection of the image side surface of the first lens and the optical axis to an effective radius vertex of the image side surface of the first lens, and SAG42 is an on-axis distance from an intersection of the image side surface of the fourth lens and the optical axis to an effective radius vertex of the image side surface of the fourth lens. More specifically, SAG12 and SAG42 satisfy 0.10<SAG12/SAG42<0.35. The sagittal height of the image side surface of the first lens and the sagittal height of the image side surface of the fourth lens are beneficial to reducing the bending degree of the first lens and the bending degree of the fourth lens, so that the processing difficulty of the first lens and the fourth lens is reduced; and in addition, the optical imaging system has better stability during assembly.

In an exemplary embodiment, the optical imaging system may further comprise at least one diaphragm. The diaphragm may be disposed at an appropriate position as needed, for example, between the object side and the first lens. Optionally, the optical imaging system may further comprise a filter for correcting color deviation and/or a protective glass for protecting the photosensitive elements located on the imaging plane.

The optical imaging system according to the above embodiments of the present application may employ a plurality of lenses, for example, seven lenses as described above. By reasonably distributing the refractive power, the surface shape, the center thickness of each lens, the on-axis distance between each lens and the like, the volume of the imaging system can be effectively reduced, the sensitivity of the imaging system can be reduced, and the processability of the imaging system can be improved, so that the optical imaging system is more beneficial to production and processing and can be suitable for portable electronic products. Meanwhile, the optical imaging system further has excellent optical performances of miniaturization, high pixel, high resolution, large aperture, bright field and the like.

In the embodiments of the present application, at least one of the mirror surfaces of each lens is an aspherical mirror surface, that is, at least one of the object side surface of the first lens to the image side surface of the seventh lens is an aspherical mirror surface. The aspheric lens is characterized in that: the curvature varies continuously from the center of the lens to the periphery of the lens. Unlike a spherical lens having a constant curvature from the center to the periphery of the lens, an aspherical lens has a better curvature radius characteristic, and has advantages of improving distortion aberration and improving astigmatic aberration. By adopting the aspherical lens, the aberration occurring at the time of imaging can be eliminated as much as possible, thereby improving the imaging quality. Optionally, at least one of the object side surface and the image side surface of each of the first lens, the second lens, the third lens, the fourth lens, the fifth lens, the sixth lens, and the seventh lens is an aspherical mirror surface. Optionally, the object side surface and the image side surface of each of the first lens, the second lens, the third lens, the fourth lens, the fifth lens, the sixth lens and the seventh lens are aspheric mirror surfaces.

However, it will be appreciated by those skilled in the art that the number of lenses of the optical imaging system may be varied to achieve the various results and advantages described in the present specification without departing from the technical scheme of the claims herein. For example, although seven lenses are exemplified in the embodiments of the application, the optical imaging system is not limited to comprising seven lenses. If desired, the optical imaging system may also comprise other numbers of lenses.

Specific examples of optical imaging systems applicable to the above-described embodiments are further described below with reference to the accompanying drawings.

Embodiment 1

An optical imaging system according to embodiment 1 of the present application is described below with reference to FIG. 1 to 2D. FIG. 1 shows a schematic structural diagram of the optical imaging system according to embodiment 1 of the present application.

As shown in FIG. 1, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is a concave surface. The third lens E3 has negative refractive power, and the object side surface S5 is a convex surface and the image side surface S6 is a concave surface. The fourth lens E4 has positive refractive power, and the object side surface S7 and the image side surface S8 thereof are convex surfaces. The fifth lens E5 has negative refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

Table 1 shows a basic parameter table of the optical imaging system of example 1, in which the units of the curvature radius, the thickness/distance, and the focal length are all millimeters (mm).

TABLE 1

| Surface Number | Surface Type | Curvature Radius | Thickness/Distance | Materials | | Focal Length | Cone Coefficient |
| --- | --- | --- | --- | --- | --- | --- | --- |
| | | | | Refractive Index | Dispersion Coefficient | | |
| OBJ | Spherical surface | Infinity | Infinity | | | | |

TABLE 1-continued

| Surface Number | Surface Type | Curvature Radius | Thickness/ Distance | Materials Refractive Index | Dispersion Coefficient | Focal Length | Cone Coefficient |
|---|---|---|---|---|---|---|---|
| STO | Spherical surface | Infinity | −0.3000 | | | | |
| S1 | Aspheric surface | 4.4620 | 0.7510 | 1.55 | 56.11 | 6.06 | −0.7990 |
| S2 | Aspheric surface | −12.0587 | 0.0500 | | | | 1.0000 |
| S3 | Aspheric surface | 2.7014 | 0.3000 | 1.68 | 19.25 | −12.30 | 0.0451 |
| S4 | Aspheric surface | 1.9486 | 0.6133 | | | | −0.0084 |
| S5 | Aspheric surface | 8.0449 | 0.3000 | 1.68 | 19.25 | −17.80 | 0.7484 |
| S6 | Aspheric surface | 4.7527 | 0.0813 | | | | −8.4481 |
| S7 | Aspheric surface | 10.4750 | 0.7973 | 1.55 | 56.11 | 10.62 | 1.0000 |
| S8 | Aspheric surface | −12.6261 | 0.2932 | | | | 0.1276 |
| S9 | Aspheric surface | 3.1365 | 0.4368 | 1.55 | 56.11 | −18.51 | 0.7371 |
| S10 | Aspheric surface | 2.2757 | 0.3797 | | | | −8.0000 |
| S11 | Aspheric surface | 4.3147 | 0.9841 | 1.55 | 56.11 | 2.89 | 0.0466 |
| S12 | Aspheric surface | −2.2826 | 0.4732 | | | | −0.4929 |
| S13 | Aspheric surface | −6.8937 | 0.5000 | 1.54 | 55.74 | −2.93 | −39.7783 |
| S14 | Aspheric surface | 2.0849 | 0.7324 | | | | −1.0035 |
| S15 | Spherical surface | Infinity | 0.2100 | 1.52 | 64.17 | | |
| S16 | Spherical surface | Infinity | 0.4000 | | | | |
| S17 | Spherical surface | Infinity | | | | | |

In embodiment 1, the value of the effective focal length f of the optical imaging system is 5.15 mm, the value of the on-axis distance TTL from the object side surface S1 of the first lens E1 to the imaging plane S17 is 7.30 mm, the value of ImgH (half of the diagonal length of the effective pixel area on the imaging plane S17) is 4.48 mm, and the value of Semi-FOV (half of field of view) is 40.68 degrees.

In embodiment 1, the object side surface and the image side surface of any one of the first lens E1 to the seventh lens E7 are aspheric, and the surface type x of each aspheric lens can be defined by, but not limited to, the following aspheric formula:

$$x = \frac{ch^2}{1 + \sqrt{1 - (k+1)c^2h^2}} + \sum A_i h^i \quad (1)$$

Wherein x is the sagittal height of the distance from the aspheric surface vertex when the aspheric surface is at the position with the height of h along the optical axis direction; c is the paraxial curvature of the aspheric surface, c=1/R (i.e., paraxial curvature c is the reciprocal of the curvature radius R in Table 1 above); k is the conic coefficient; Ai is a correction coefficient of the i-th order of the aspherical surface. Table 2 below gives higher order coefficients $A_4$, $A_6$, $A_8$, $A_{10}$, $A_{12}$, $A_{14}$, $A_{16}$, $A_{18}$ and $A_{20}$, that can be used for each of the aspherical mirror surfaces S1 to S14 in example 1.

TABLE 2

| Surface Number | A4 | A6 | A8 | A10 | A12 | A14 | A16 | A18 | A20 |
|---|---|---|---|---|---|---|---|---|---|
| S1 | 1.0522E-03 | 2.3448E-03 | −8.0980E-03 | 1.0683E-02 | −8.3971E-03 | 4.0258E-03 | −1.1620E-03 | 1.8507E-04 | −1.2538E-05 |
| S2 | 2.0108E-02 | −3.1328E-03 | −1.1019E-02 | 1.3357E-02 | −8.4504E-03 | 3.2706E-03 | −7.8531E-04 | 1.0779E-04 | −6.5134E-06 |
| S3 | −4.6220E-02 | 3.5387E-02 | −3.9372E-02 | 3.0120E-02 | −1.5576E-02 | 5.1484E-03 | −9.7690E-04 | 8.6528E-05 | −1.8572E-06 |
| S4 | −8.5007E-02 | 4.9032E-02 | −4.6289E-02 | 3.4817E-02 | −2.2166E-02 | 1.1008E-02 | −3.8316E-03 | 8.2285E-04 | −7.9629E-05 |
| S5 | −4.8704E-02 | 2.1233E-02 | −2.0850E-02 | 2.0453E-02 | −1.5251E-02 | 7.1021E-03 | −2.0278E-03 | 3.6845E-04 | −3.4404E-05 |
| S6 | −4.7761E-02 | 4.5904E-02 | −7.4000E-02 | 8.3491E-02 | −5.5693E-02 | 2.1885E-02 | −4.9541E-03 | 5.9446E-04 | −2.9360E-05 |
| S7 | −1.2729E-02 | 4.0830E-02 | −9.0061E-02 | 1.0389E-01 | −6.7982E-02 | 2.6591E-02 | −6.1898E-03 | 7.9367E-04 | −4.3328E-05 |
| S8 | −4.2466E-02 | 5.7544E-02 | −5.4880E-02 | 2.9638E-02 | −9.4432E-03 | 1.6209E-03 | −8.6006E-05 | −1.4136E-05 | 1.7783E-06 |

TABLE 2-continued

| Surface Number | A 4 | A 6 | A 8 | A 10 | A 12 | A 14 | A 16 | A 18 | A 20 |
|---|---|---|---|---|---|---|---|---|---|
| S9 | −1.6835E−01 | 1.4070E−01 | −9.9168E−02 | 4.9867E−02 | −1.8514E−02 | 4.9828E−03 | −9.2671E−04 | 1.0697E−04 | −5.7137E−06 |
| S10 | −1.0988E−01 | 8.8547E−02 | −6.8401E−02 | 4.0465E−02 | −1.8126E−02 | 5.6863E−03 | −1.1513E−03 | 1.3395E−04 | −6.7319E−06 |
| S11 | −2.7089E−02 | 1.2695E−02 | −1.7454E−02 | 1.2928E−02 | −6.4626E−03 | 2.0098E−03 | −3.7857E−04 | 3.9956E−05 | −1.8051E−06 |
| S12 | 8.3164E−02 | −4.1114E−02 | 1.4514E−02 | −3.3864E−03 | 2.2733E−04 | 9.9835E−05 | −2.6033E−05 | 2.3961E−06 | −7.9243E−08 |
| S13 | −2.8661E−02 | −3.0721E−02 | 1.6935E−02 | −4.0811E−03 | 6.1956E−04 | −6.4010E−05 | 4.3629E−06 | −1.7514E−07 | 3.1042E−09 |
| S14 | −9.3701E−02 | 2.3487E−02 | −4.7467E−03 | 7.9866E−04 | −1.0586E−04 | 9.9269E−06 | −5.9725E−07 | 2.0393E−08 | −2.9867E−10 |

FIG. 2A shows an on-axis chromatic aberration curve of the optical imaging system of embodiment 1, and represents the deviation of the focal point of light rays of different wavelengths after passing through the system. FIG. 2B shows an astigmatism curve of the optical imaging system of embodiment 1, and represents a meridional image surface curvature and a sagittal image surface curvature. FIG. 2C shows a distortion curve of the optical imaging system of embodiment 1, and represents distortion magnitude values corresponding to different image heights. FIG. 2D shows a chromatic aberration of magnification curve of the optical imaging system of embodiment 1, and represents the deviation of different image heights on the imaging surface after the light passes through the system. As can be seen from FIG. 2A to 2D, the optical imaging system according to embodiment 1 can achieve good imaging quality.

Embodiment 2

An optical imaging system according to embodiment 2 of the present application is described below with reference to FIG. 3 to 4D. In the present embodiment and the following embodiments, descriptions partly similar to embodiment 1 will be omitted for the sake of brevity.

FIG. 3 shows a schematic structural diagram of the optical imaging system according to embodiment 2 of the present application.

As shown in FIG. 3, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex. The second lens E2 has negative refractive power, and the object side surface S3 is a convex surface and the image side surface S4 is a concave surface. The third lens E3 has positive refractive power, and the object side surface S5 is a convex surface and the image side surface S6 is a concave surface. The fourth lens E4 has positive refractive power, and the object side surface S7 is a concave surface and the image side surface S8 is a convex surface. The fifth lens E5 has negative refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 2, the value of the effective focal length f of the optical imaging system is 5.17 mm, the value of the on-axis distance TTL from the object side surface S1 of the first lens E1 to the imaging plane S17 is 7.25 mm, the value of the ImgH (half of the diagonal length of the effective pixel area on the imaging plane S17) is 4.48 mm, and the value of Semi-FOV (half of field of view) is 40.07 degrees.

Table 3 shows a basic parameter table of the optical imaging system of embodiment 2, in which the units of the curvature radius, the thickness/distance, and the focal length are all millimeters (mm). Table 4 shows the coefficients of the high order terms that can be used for each aspherical mirror surface in embodiment 2, wherein each aspherical surface type can be defined by the formula (1) given in embodiment 1 described above.

TABLE 3

| | | | | Materials | | | |
|---|---|---|---|---|---|---|---|
| Surface Number | Surface Type | Curvature Radius | Thickness/ Distance | Refractive Index | Dispersion Coefficient | Focal Length | Cone Coefficient |
| OBJ | Spherical surface | Infinity | Infinity | | | | |
| STO | Spherical surface | Infinity | −0.4341 | | | | |
| S1 | Aspheric surface | 3.5093 | 0.7830 | 1.55 | 56.11 | 5.54 | 0.3943 |
| S2 | Aspheric surface | −20.1158 | 0.0632 | | | | −40.6596 |
| S3 | Aspheric surface | 2.7117 | 0.2787 | 1.68 | 19.25 | −10.48 | 1.3608 |
| S4 | Aspheric surface | 1.8809 | 0.7148 | | | | −1.0000 |
| S5 | Aspheric surface | 8.0834 | 0.2405 | 1.68 | 19.25 | 1000.06 | −1.0000 |
| S6 | Aspheric surface | 8.0827 | 0.0915 | | | | −93.2423 |

TABLE 3-continued

| Surface Number | Surface Type | Curvature Radius | Thickness/ Distance | Refractive Index | Dispersion Coefficient | Focal Length | Cone Coefficient |
|---|---|---|---|---|---|---|---|
| S7 | Aspheric surface | −18.5293 | 0.9321 | 1.55 | 56.11 | 41.93 | 60.8959 |
| S8 | Aspheric surface | −10.4221 | 0.1485 | | | | 0.4609 |
| S9 | Aspheric surface | 3.1099 | 0.4721 | 1.55 | 56.11 | −43.10 | 0.7708 |
| S10 | Aspheric surface | 2.5996 | 0.3506 | | | | −7.3878 |
| S11 | Aspheric surface | 5.0155 | 0.8968 | 1.55 | 56.11 | 3.26 | 1.1195 |
| S12 | Aspheric surface | −2.5835 | 0.5151 | | | | −0.4657 |
| S13 | Aspheric surface | −13.9611 | 0.5000 | 1.54 | 55.74 | −3.16 | 6.6122 |
| S14 | Aspheric surface | 1.9569 | 0.6580 | | | | −1.0023 |
| S15 | Spherical surface | Infinity | 0.2100 | 1.52 | 64.17 | | |
| S16 | Spherical surface | Infinity | 0.4000 | | | | |
| S17 | Spherical surface | Infinity | | | | | |

TABLE 4

| Surface Number | A4 | A6 | A8 | A10 | A12 | A14 | A16 | A18 | A20 |
|---|---|---|---|---|---|---|---|---|---|
| S1 | −7.5147E−04 | 1.9738E−03 | −6.2412E−03 | 8.1662E−03 | −6.4850E−03 | 3.1782E−03 | −9.4670E−04 | 1.5650E−04 | −1.1047E−05 |
| S2 | 1.9129E−02 | −8.6156E−03 | 1.4351E−03 | 4.8894E−04 | −3.7497E−04 | 7.2712E−05 | −6.1247E−06 | 1.9262E−06 | −4.5313E−07 |
| S3 | −5.1753E−02 | 2.8820E−02 | −4.0142E−02 | 4.6953E−02 | −2.4190E−02 | 2.4314E−02 | −8.8325E−03 | 1.7966E−03 | −1.5752E−04 |
| S4 | −6.1443E−02 | 5.5963E−02 | −7.6062E−02 | 1.0227E−01 | −1.0084E−01 | 6.5159E−02 | −2.5817E−02 | 5.6936E−03 | −5.3321E−04 |
| S5 | −1.5484E−02 | −6.5958E−02 | 7.0667E−02 | −3.9733E−02 | 5.9261E−03 | 6.1348E−03 | −3.9660E−03 | 9.8405E−04 | −9.3497E−05 |
| S6 | 7.4966E−02 | −1.6701E−01 | 1.7508E−01 | −1.3170E−01 | 7.2471E−02 | −2.8021E−02 | 7.1614E−03 | −1.0763E−03 | 7.1118E−05 |
| S7 | 9.1172E−02 | −9.8846E−02 | 6.4867E−02 | −2.4562E−02 | 4.9376E−03 | −2.3520E−04 | −1.0965E−04 | 1.9802E−05 | −6.6259E−07 |
| S8 | −4.3523E−02 | 3.6815E−02 | −2.4014E−02 | 3.3677E−03 | 5.6324E−03 | −4.1156E−06 | 1.2878E−03 | −2.0119E−04 | 1.2813E−05 |
| S9 | −1.3953E−01 | 8.4546E−02 | −4.3686E−02 | 1.1792E−02 | −2.8957E−04 | −8.1492E−04 | 2.3916E−04 | −2.8013E−05 | 1.1871E−06 |
| S10 | −7.6200E−02 | 2.5782E−02 | −3.1817E−03 | −4.0334E−03 | 1.9715E−03 | −2.5260E−04 | −3.9102E−05 | 1.3423E−05 | −9.7675E−07 |
| S11 | −1.0081E−02 | −4.8922E−03 | −3.5904E−03 | 7.4801E−03 | −5.1562E−03 | 1.7550E−03 | −3.2549E−04 | 3.1696E−05 | −1.2685E−06 |
| S12 | 6.8104E−02 | −3.4365E−02 | 1.2199E−02 | −7.1298E−04 | −1.3468E−03 | 5.2572E−04 | −8.5293E−05 | 6.5655E−06 | −1.9738E−07 |
| S13 | −5.0305E−02 | −2.4285E−02 | 2.4207E−02 | −1.0603E−02 | 2.7635E−03 | −4.3234E−04 | 3.9958E−05 | −2.0307E−06 | 4.4176E−08 |
| S14 | −1.1300E−01 | 3.5946E−02 | −9.0738E−03 | 1.6421E−03 | −2.0332E−04 | 1.6682E−05 | −8.6803E−07 | 2.5974E−08 | −3.4064E−10 |

FIG. 4A shows an on-axis chromatic aberration curve of the optical imaging system of embodiment 2, and represents the deviation of the focal point of light rays of different wavelengths after passing through the system. FIG. 4B shows an astigmatism curve of the optical imaging system of embodiment 2, and represents a meridional image surface curvature and a sagittal image surface curvature. FIG. 4C shows a distortion curve of the optical imaging system of embodiment 2, and represents distortion magnitude values corresponding to different image heights. FIG. 4D shows a chromatic aberration of magnification curve of the optical imaging system of embodiment 2, and represents the deviation of different image heights on the imaging surface after the light passes through the system. As can be seen from FIG. 4A to 4D, the optical imaging system according to embodiment 2 can achieve good imaging quality.

Embodiment 3

An optical imaging system according to embodiment 3 of the present application is described below with reference to FIG. 5 to 6D. FIG. 5 shows a schematic structural diagram of the optical imaging system according to embodiment 3 of the present application.

As shown in FIG. 5, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is a concave surface. The third lens E3 has negative refractive power, and the object side surface S5 is a convex surface and the image side surface S6 is a concave surface. The fourth lens E4 has negative refractive power, and the object side surface S7 is a concave surface and the image side surface S8 is a convex surface. The fifth lens E5 has positive refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 3, the value of an effective focal length f of the optical imaging system is 5.18 mm, the value of the on-axis distance TTL from the object side surface S1 of the first lens E1 to the imaging plane S17 is 7.20 mm, the value of the ImgH (half of the diagonal length of the effective pixel area on the imaging plane S17) is 4.48 mm, and the value of the Semi-FOV (half of field of view) is 40.00 degrees.

Table 5 shows a basic parameter table of the optical imaging system of embodiment 3, in which the units of the curvature radius, the thickness/distance, and the focal length are all millimeters (mm). Table 6 shows the coefficients of the high order terms that can be used for each aspherical mirror surface in embodiment 3, wherein each aspherical surface type can be defined by the formula (1) given in embodiment 1 described above.

TABLE 5

| Surface Number | Surface Type | Curvature Radius | Thickness/ Distance | Refractive Index | Dispersion Coefficient | Focal Length | Cone Coefficient |
|---|---|---|---|---|---|---|---|
| OBJ | Spherical surface | Infinity | Infinity | | | | |
| STO | Spherical surface | Infinity | −0.4167 | | | | |
| S1 | Aspheric surface | 3.5050 | 0.7779 | 1.55 | 56.11 | 6.22 | −0.3855 |
| S2 | Aspheric surface | −100.0000 | 0.0700 | | | | −90.4015 |
| S3 | Aspheric surface | 3.0790 | 0.2915 | 1.68 | 19.25 | −13.78 | −0.2259 |
| S4 | Aspheric surface | 2.2270 | 0.6887 | | | | 0.8604 |
| S5 | Aspheric surface | 10.2799 | 0.2200 | 1.68 | 19.25 | −35.64 | −1.0000 |
| S6 | Aspheric surface | 7.1482 | 0.0849 | | | | −96.3404 |
| S7 | Aspheric surface | −212.9566 | 0.7434 | 1.55 | 56.11 | −999.87 | −99.0000 |
| S8 | Aspheric surface | −349.6105 | 0.1680 | | | | 99.0000 |
| S9 | Aspheric surface | 3.0075 | 0.6500 | 1.55 | 56.11 | 17.60 | 0.6025 |
| S10 | Aspheric surface | 4.0431 | 0.3495 | | | | −4.3871 |
| S11 | Aspheric surface | 8.1414 | 0.7139 | 1.55 | 56.11 | 3.90 | −3.9153 |
| S12 | Aspheric surface | −2.7949 | 0.7216 | | | | −0.3154 |
| S13 | Aspheric surface | −21.1727 | 0.5000 | 1.54 | 55.74 | −3.39 | 59.7507 |
| S14 | Aspheric surface | 2.0068 | 0.6107 | | | | −1.0709 |
| S15 | Spherical surface | Infinity | 0.2100 | 1.52 | 64.17 | | |
| S16 | Spherical surface | Infinity | 0.4000 | | | | |
| S17 | Spherical surface | Infinity | | | | | |

TABLE 6

| Surface Number | A 4 | A 6 | A 8 | A 10 | A 12 | A 14 | A 16 | A 18 | A 20 |
|---|---|---|---|---|---|---|---|---|---|
| S1 | −5.5910E−05 | 7.4423E−03 | −1.8235E−02 | 2.4239E−02 | −1.9540E−02 | 9.6759E−03 | −2.8840E−03 | 4.7388E−04 | −3.3018E−05 |
| S2 | −3.2402E−02 | 8.6080E−02 | −1.2734E−01 | 1.2290E−01 | −7.9123E−02 | 3.3332E−02 | −8.7947E−03 | 1.3157E−03 | −8.5127E−05 |
| S3 | −7.9512E−02 | 1.0324E−01 | −1.3297E−01 | 1.2900E−01 | −8.8672E−02 | 4.1512E−02 | −1.2473E−02 | 2.1660E−03 | −1.6573E−04 |
| S4 | −7.8801E−02 | 4.9688E−02 | −8.8594E−02 | 1.4379E−01 | −1.6473E−01 | 1.1920E−01 | −5.1998E−02 | 1.2503E−02 | −1.2757E−03 |
| S5 | −2.9077E−02 | −4.9751E−02 | 8.2136E−02 | −1.0428E−01 | 9.4280E−02 | −5.8184E−02 | 2.2781E−02 | −4.9657E−03 | 4.5415E−04 |
| S6 | 3.4178E−02 | −1.0131E−01 | 1.1178E−01 | −9.6900E−02 | 6.8174E−02 | −3.6416E−02 | 1.2898E−02 | −2.5598E−03 | 2.1092E−04 |
| S7 | 2.4867E−02 | −2.5318E−02 | −7.0068E−03 | 3.0838E−02 | −2.4801E−02 | 8.8014E−03 | −1.2497E−03 | −1.5099E−05 | 1.4156E−05 |
| S8 | −1.0273E−01 | 7.7853E−02 | −6.8261E−02 | 4.4712E−02 | −2.1242E−02 | 7.4185E−03 | −1.8313E−03 | 2.7632E−04 | −1.8326E−05 |
| S9 | −1.2684E−01 | 6.5106E−02 | −3.3914E−02 | 8.8383E−03 | 6.9541E−04 | −1.1918E−03 | 3.4168E−04 | −4.2980E−05 | 2.0624E−06 |
| S10 | −4.3109E−02 | −2.2877E−02 | 4.1683E−02 | −3.3440E−02 | 1.5228E−02 | −4.2099E−03 | 7.0563E−04 | −6.6786E−05 | 2.7950E−06 |
| S11 | 2.0584E−02 | −2.9978E−02 | 2.1198E−02 | −6.5254E−03 | −3.6672E−04 | 7.5064E−04 | −1.9482E−04 | 2.1409E−05 | −8.7194E−07 |
| S12 | 4.2079E−02 | −2.8786E−02 | 1.3434E−02 | −1.7130E−03 | −1.1731E−03 | 5.5179E−04 | −9.7405E−05 | 7.9559E−06 | −2.5050E−07 |
| S13 | −8.7372E−02 | −4.9861E−03 | 2.4525E−02 | −1.5653E−02 | 5.5167E−03 | −1.1962E−03 | 1.5872E−04 | −1.1747E−05 | 3.6888E−07 |
| S14 | −1.2032E−01 | 4.2384E−02 | −1.1394E−02 | 2.1515E−03 | −2.7866E−04 | 2.4053E−05 | −1.3148E−06 | 4.0933E−08 | −5.4949E−10 |

Figures 6A, 6B:
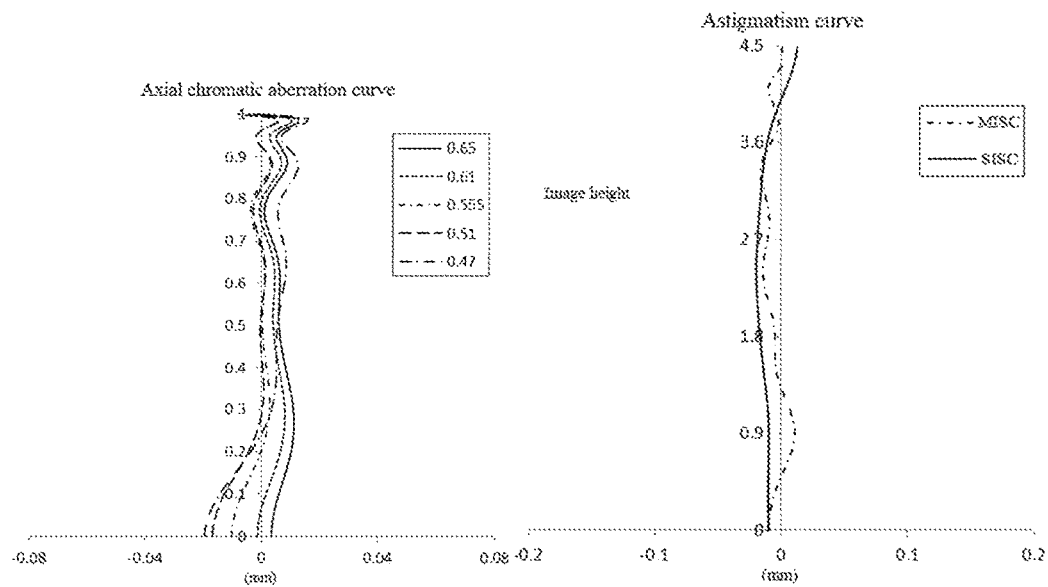
FIG. 6A to 6D show an axial chromatic aberration curve, an astigmatism curve, a distortion curve, and a magnification chromatic aberration curve, respectively, of the optical imaging system of embodiment 3.
Figures 6C, 6D:
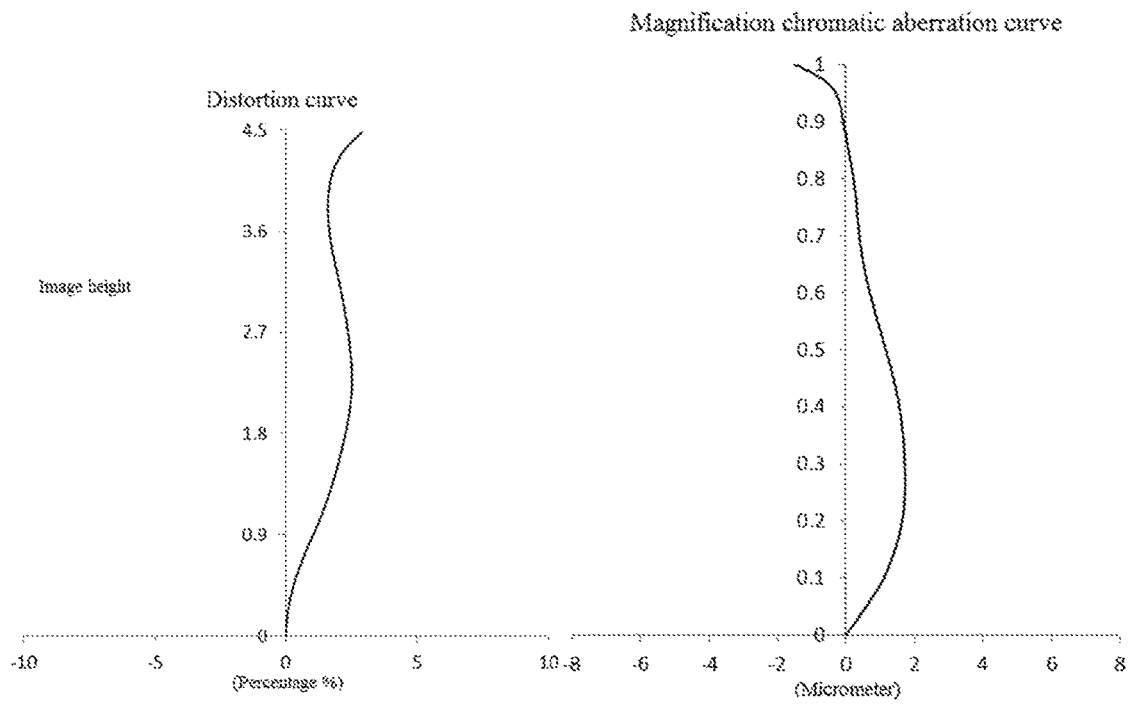

FIG. 6A shows an on-axis chromatic aberration curve of the optical imaging system of embodiment 3, and represents the deviation of the focal point of light rays of different wavelengths after passing through the system. FIG. 6B shows an astigmatism curve of the optical imaging system of embodiment 3, and represents a meridional image surface curvature and a sagittal image surface curvature. FIG. 6C shows a distortion curve of the optical imaging system of embodiment 3, and represents distortion magnitude values corresponding to different image heights. FIG. 6D shows a chromatic aberration of magnification curve of the optical imaging system of embodiment 3, and represents the deviation of different image heights on the imaging surface after the light passes through the system. As can be seen from FIG. 6A to 6D, the optical imaging system according to embodiment 3 can achieve good imaging quality.

Embodiment 4

Figure 7:
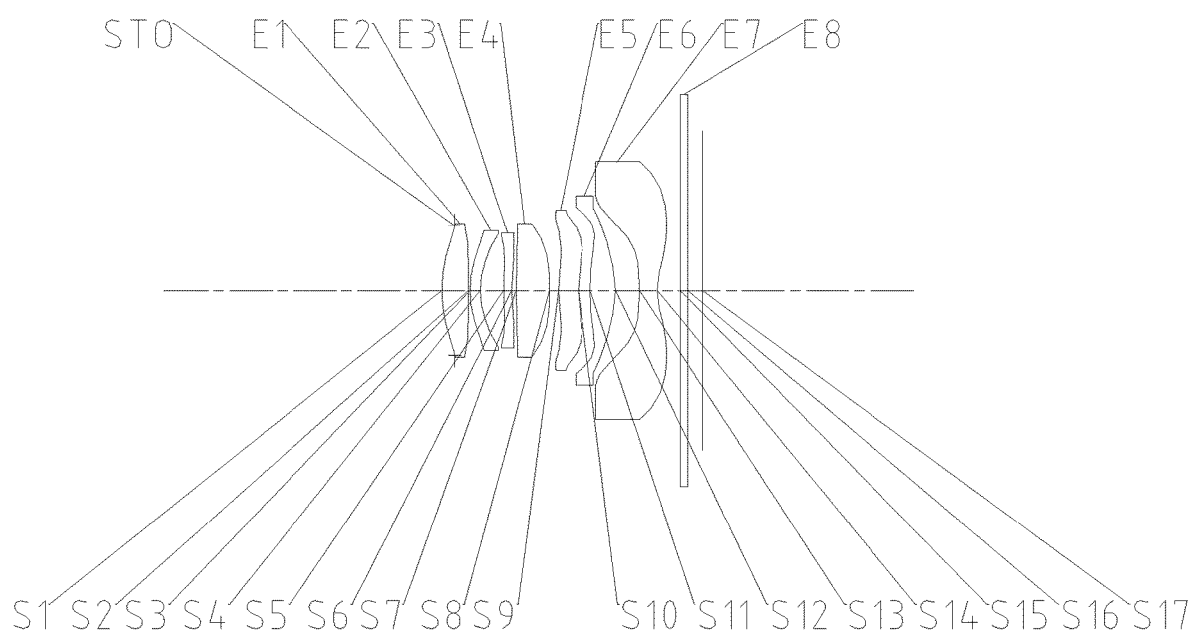
FIG. 7 shows a schematic structural diagram of an optical imaging system according to embodiment 4 of the present application.

An optical imaging system according to embodiment 4 of the present application is described below with reference to FIG. 7 to 8D. FIG. 7 shows a schematic structural diagram of the optical imaging system according to embodiment 4 of the present application.

As shown in FIG. 7, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is a concave surface. The third lens E3 has negative refractive power, and the object side surface S5 is a convex surface and the image side surface S6 is a concave surface. The fourth lens E4 has positive refractive power, and the object side surface S7 and the image side surface S8 thereof are convex surfaces. The fifth lens E5 has positive refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 4, the value of the effective focal length f of the optical imaging system is 5.17 mm, the value of the on-axis distance TTL from the object side surface S1 of the first lens E1 to the imaging plane S17 is 7.31 mm, the value of ImgH (half of the diagonal length of the effective pixel area on the imaging plane S17) is 4.48 mm, and the value of Semi-FOV (half of field of view) is 40.06 degrees.

Table 7 shows a basic parameter table of the optical imaging system of embodiment 4, in which the units of the curvature radius, the thickness/distance, and the focal length are all millimeters (mm). Table 8 shows the coefficients of the high order terms that can be used for each aspherical mirror surface in embodiment 4, wherein each aspherical surface type can be defined by the formula (1) given in embodiment 1 described above.

TABLE 7

| Surface Number | Surface Type | Curvature Radius | Thickness/ Distance | Materials | | Focal Length | Cone Coefficient |
| | | | | Refractive Index | Dispersion Coefficient | | |
| --- | --- | --- | --- | --- | --- | --- | --- |
| OBJ | Spherical surface | Infinity | Infinity | | | | |
| STO | Spherical surface | Infinity | −0.3507 | | | | |
| S1 | Aspheric surface | 3.9659 | 0.7444 | 1.55 | 56.11 | 6.48 | −0.4568 |
| S2 | Aspheric surface | −30.5121 | 0.0500 | | | | −5.7874 |
| S3 | Aspheric surface | 2.7563 | 0.2790 | 1.68 | 19.25 | −14.86 | 0.4405 |
| S4 | Aspheric surface | 2.0755 | 0.6580 | | | | 0.3815 |
| S5 | Aspheric surface | 6.8534 | 0.2265 | 1.68 | 19.25 | −19.27 | −1.0000 |
| S6 | Aspheric surface | 4.4343 | 0.1293 | | | | −65.0539 |
| S7 | Aspheric surface | 15.3363 | 0.9294 | 1.55 | 56.11 | 16.33 | −69.2129 |
| S8 | Aspheric surface | −20.8384 | 0.2618 | | | | 0.2712 |
| S9 | Aspheric surface | 3.1786 | 0.5587 | 1.55 | 56.11 | 499.70 | 0.7890 |
| S10 | Aspheric surface | 3.0164 | 0.3230 | | | | −7.6953 |
| S11 | Aspheric surface | 6.1278 | 0.7218 | 1.55 | 56.11 | 3.56 | 2.8852 |
| S12 | Aspheric surface | −2.7308 | 0.6701 | | | | −0.4314 |
| S13 | Aspheric surface | −22.0736 | 0.5000 | 1.54 | 55.74 | −3.34 | 41.2042 |
| S14 | Aspheric surface | 1.9699 | 0.6480 | | | | −1.0277 |

TABLE 7-continued

|  |  |  |  | Materials | | | |
| --- | --- | --- | --- | --- | --- | --- | --- |
| Surface Number | Surface Type | Curvature Radius | Thickness/ Distance | Refractive Index | Dispersion Coefficient | Focal Length | Cone Coefficient |
| S15 | Spherical surface | Infinity | 0.2100 | 1.52 | 64.17 | | |
| S16 | Spherical surface | Infinity | 0.4000 | | | | |
| S17 | Spherical surface | Infinity | | | | | |

TABLE 8

| Surface Number | A 4 | A 6 | A 8 | A 10 | A 12 | A 14 | A 16 | A 18 | A 20 |
| --- | --- | --- | --- | --- | --- | --- | --- | --- | --- |
| S1 | 8.1208E−04 | 3.3720E−03 | −1.0598E−02 | 1.4361E−02 | −1.1548E−02 | 5.6386E−03 | −1.6496E−03 | 2.6503E−04 | −1.8012E−05 |
| S2 | −6.8796E−03 | 3.2692E−02 | −5.2298E−02 | 4.9318E−02 | −3.0292E−02 | 1.2049E−02 | −2.9909E−03 | 4.2025E−04 | −2.5531E−05 |
| S3 | −5.8253E−02 | 4.6395E−02 | −5.0287E−02 | 3.9824E−02 | −2.1997E−02 | 8.2199E−03 | −1.9558E−03 | 2.7118E−04 | −1.7593E−05 |
| S4 | −7.0135E−02 | 2.3493E−02 | −1.7596E−02 | 1.4684E−02 | −1.5953E−02 | 1.3021E−02 | −6.3808E−03 | 1.6987E−03 | −1.8860E−05 |
| S5 | −4.5684E−02 | −8.3440E−03 | 1.4354E−02 | −1.5192E−02 | 1.1554E−02 | −6.6288E−03 | 2.6355E−03 | −5.7247E−04 | 4.9518E−05 |
| S6 | 5.0594E−02 | −1.3749E−01 | 1.8676E−01 | −1.8982E−01 | 1.3697E−01 | −6.6762E−02 | 2.0778E−02 | −3.6993E−03 | 2.8468E−04 |
| S7 | −3.2695E−03 | 2.7462E−03 | −1.4536E−02 | 1.8558E−02 | −1.2688E−02 | 5.2243E−03 | −1.2872E−03 | 1.7441E−04 | −9.9910E−06 |
| S8 | −7.5131E−02 | 4.1152E−02 | −1.9595E−02 | 1.7451E−03 | 4.1250E−03 | −2.6759E−03 | 7.7718E−04 | −1.1447E−04 | 6.9764E−06 |
| S9 | −1.2145E−01 | 3.8351E−02 | −1.4908E−03 | −1.0908E−02 | 7.6144E−03 | −2.5880E−03 | 4.8733E−04 | −4.8126E−05 | 1.9308E−06 |
| S10 | −4.3552E−02 | −2.7187E−02 | 4.0779E−02 | −2.8556E−02 | 1.1523E−02 | −2.8078E−03 | 4.0941E−04 | −3.3148E−05 | 1.1749E−06 |
| S11 | 1.2274E−02 | −3.1223E−02 | 1.6256E−02 | −2.5524E−03 | −1.5541E−03 | 8.5492E−04 | −1.7913E−04 | 1.7884E−05 | −6.9733E−07 |
| S12 | 6.0920E−02 | −3.1116E−02 | 1.1101E−02 | 4.2409E−04 | −1.9130E−03 | 6.6091E−04 | −1.0235E−04 | 7.6733E−06 | −2.2671E−07 |
| S13 | −6.6505E−02 | −1.4941E−02 | 2.1041E−02 | −9.6483E−03 | 2.5487E−03 | −4.1146E−04 | 4.0727E−05 | −2.3071E−06 | 5.7715E−08 |
| S14 | −1.1192E−01 | 3.4966E−02 | −8.3246E−03 | 1.4011E−03 | −1.6189E−04 | 1.2482E−05 | −6.1389E−07 | 1.7425E−08 | −2.1724E−10 |

FIG. 8A shows an on-axis chromatic aberration curve of the optical imaging system of embodiment 4, and represents the deviation of the focal point of light rays of different wavelengths after passing through the system. FIG. 8B shows an astigmatism curve of the optical imaging system of embodiment 4, and represents a meridional image surface curvature and a sagittal image surface curvature. FIG. 8C shows a distortion curve of the optical imaging system of embodiment 4, which represents distortion magnitude values corresponding to different image heights. FIG. 8D shows a chromatic aberration of magnification curve of the optical imaging system of embodiment 4, and represents the deviation of different image heights on the imaging surface after the light passes through the system. As can be seen from FIG. 8A to 8D, the optical imaging system according to embodiment 4 can achieve good imaging quality.

Embodiment 5

Figure 9:
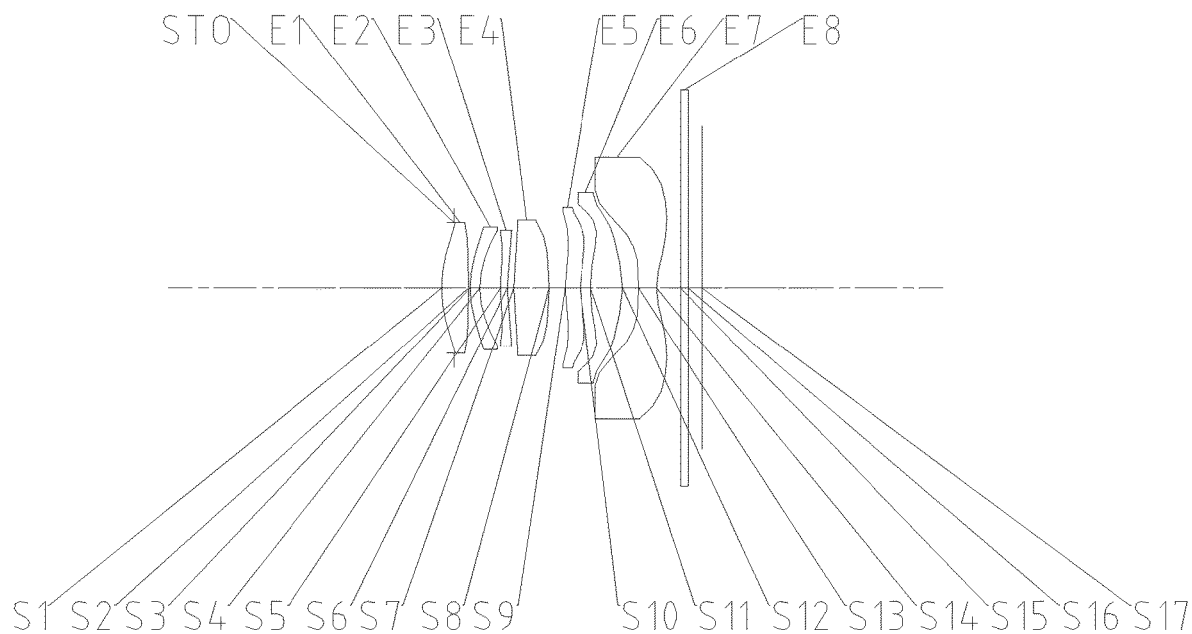
FIG. 9 shows a schematic structural diagram of an optical imaging system according to embodiment 5 of the present application.

An optical imaging system according to embodiment 5 of the present application is described below with reference to FIG. 9 to 10D. FIG. 9 shows a schematic structural diagram of the optical imaging system according to embodiment 5 of the present application.

As shown in FIG. 9, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is a concave surface. The third lens E3 has negative refractive power, and the object side surface S5 is a convex surface and the image side surface S6 is a concave surface. The fourth lens E4 has positive refractive power, and the object side surface S7 and the image side surface S8 thereof are convex surfaces. The fifth lens E5 has negative refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 5, the value of the effective focal length f of the optical imaging system is 5.20 mm, the value of the on-axis distance TTL from the object side surface S1 of the first lens E1 to the imaging plane S17 is 7.31 mm, the value of ImgH (half of the diagonal length of the effective pixel area on the imaging plane S17) is 4.48 mm, and the value of Semi-FOV (half of field of view) is 39.76 degrees.

Table 9 shows a basic parameter table of the optical imaging system of embodiment 5, in which the units of the curvature radius, the thickness/distance, and the focal length are all millimeters (mm). Table 10 shows the coefficients of the high order terms that can be used for each aspherical mirror surface in embodiment 5, wherein each aspherical surface type can be defined by the formula (1) given in embodiment 1 described above.

TABLE 9

| Surface Number | Surface Type | Curvature Radius | Thickness/ Distance | Materials Refractive Index | Materials Dispersion Coefficient | Focal Length | Cone Coefficient |
|---|---|---|---|---|---|---|---|
| OBJ | Spherical surface | Infinity | Infinity | | | | |
| STO | Spherical surface | Infinity | −0.3427 | | | | |
| S1 | Aspheric surface | 4.0233 | 0.7391 | 1.55 | 56.11 | 6.66 | −0.1971 |
| S2 | Aspheric surface | −35.5443 | 0.0500 | | | | 6.7857 |
| S3 | Aspheric surface | 2.6373 | 0.2701 | 1.68 | 19.25 | −16.77 | 0.6051 |
| S4 | Aspheric surface | 2.0519 | 0.5786 | | | | 0.1222 |
| S5 | Aspheric surface | 5.3390 | 0.1974 | 1.68 | 19.25 | −17.58 | −1.0000 |
| S6 | Aspheric surface | 3.6315 | 0.1826 | | | | −23.7252 |
| S7 | Aspheric surface | 8.4324 | 0.9895 | 1.55 | 56.11 | 10.64 | −22.8638 |
| S8 | Aspheric surface | −17.8891 | 0.4444 | | | | 0.1835 |
| S9 | Aspheric surface | 3.1504 | 0.4276 | 1.55 | 56.11 | −24.70 | 0.7513 |
| S10 | Aspheric surface | 2.4314 | 0.2974 | | | | −6.9817 |
| S11 | Aspheric surface | 4.4538 | 0.8994 | 1.55 | 56.11 | 3.14 | 0.9672 |
| S12 | Aspheric surface | −2.5889 | 0.4523 | | | | −0.3991 |
| S13 | Aspheric surface | −15.4488 | 0.5000 | 1.54 | 55.74 | −3.00 | 8.3124 |
| S14 | Aspheric surface | 1.8193 | 0.6716 | | | | −1.0352 |
| S15 | Spherical surface | Infinity | 0.2100 | 1.52 | 64.17 | | |
| S16 | Spherical surface | Infinity | 0.4004 | | | | |
| S17 | Spherical surface | Infinity | | | | | |

TABLE 10

| Surface Number | A 4 | A 6 | A 8 | A 10 | A 12 | A 14 | A 16 | A 18 | A 20 |
|---|---|---|---|---|---|---|---|---|---|
| S1 | −2.4104E−04 | 4.6993E−03 | −1.3982E−02 | 1.8956E−02 | −1.5328E−02 | 7.5283E−03 | −2.2070E−03 | 3.5426E−04 | −2.3976E−05 |
| S2 | −1.1205E−02 | 3.5368E−02 | −5.6662E−02 | 5.4991E−02 | −3.4526E−02 | 1.3960E−02 | −3.5102E−03 | 4.9876E−04 | −3.0616E−05 |
| S3 | −6.0611E−02 | 3.9685E−02 | −4.7248E−02 | 3.9228E−02 | −2.1750E−02 | 7.9837E−03 | −1.8668E−03 | 2.5754E−04 | −1.6948E−05 |
| S4 | −6.2817E−02 | 1.4443E−02 | −9.0684E−03 | 5.3221E−03 | −5.8387E−03 | 5.8868E−03 | −3.3304E−03 | 9.7527E−04 | −1.1503E−04 |
| S5 | −6.2391E−02 | 3.6214E−02 | −4.9056E−02 | 5.2262E−02 | −4.0162E−02 | 2.0654E−02 | −6.5855E−03 | 1.1972E−03 | −9.6293E−05 |
| S6 | −1.1279E−02 | −6.2734E−03 | 2.1870E−03 | −2.1625E−04 | −7.1308E−05 | 4.4967E−05 | 9.5415E−05 | −5.7070E−05 | 8.0674E−06 |
| S7 | −1.4764E−02 | 1.2999E−02 | −1.3717E−02 | 1.1842E−02 | −7.2755E−03 | 3.0419E−03 | −7.9341E−04 | 1.1199E−04 | −6.3396E−06 |
| S8 | −3.9076E−02 | 1.5659E−02 | −2.7620E−03 | −6.6888E−03 | 7.1633E−03 | −3.5123E−03 | 9.5688E−04 | −1.3996E−04 | 8.5826E−06 |
| S9 | −1.1187E−01 | 3.8892E−02 | −2.3773E−03 | −9.9474E−03 | 6.7402E−03 | −2.2277E−03 | 4.1105E−04 | −3.9829E−05 | 1.5568E−06 |
| S10 | −6.1124E−02 | −4.1832E−04 | 1.6376E−02 | −1.2126E−02 | 3.9341E−03 | −5.2183E−04 | −2.0559E−05 | 1.2948E−05 | −9.7673E−07 |
| S11 | 1.4182E−04 | −1.8165E−02 | 3.4148E−03 | 4.9904E−03 | −4.4097E−03 | 1.5420E−03 | −2.7983E−04 | 2.6115E−05 | −9.8702E−07 |
| S12 | 8.9677E−02 | −5.1574E−02 | 2.1810E−02 | −4.5659E−03 | −2.7080E−04 | 3.1400E−04 | −5.7622E−05 | 4.4826E−06 | −1.3070E−07 |
| S13 | −4.0678E−02 | −4.2280E−02 | 3.8081E−02 | −1.6460E−02 | 4.2524E−03 | −6.7148E−04 | 6.4194E−05 | −3.4626E−06 | 8.1854E−08 |
| S14 | −1.2514E−01 | 4.1749E−02 | −1.0609E−02 | 1.8997E−03 | −2.3071E−04 | 1.8424E−05 | −9.2526E−07 | 2.6480E−08 | −3.2884E−10 |

Figures 10A, 10B:
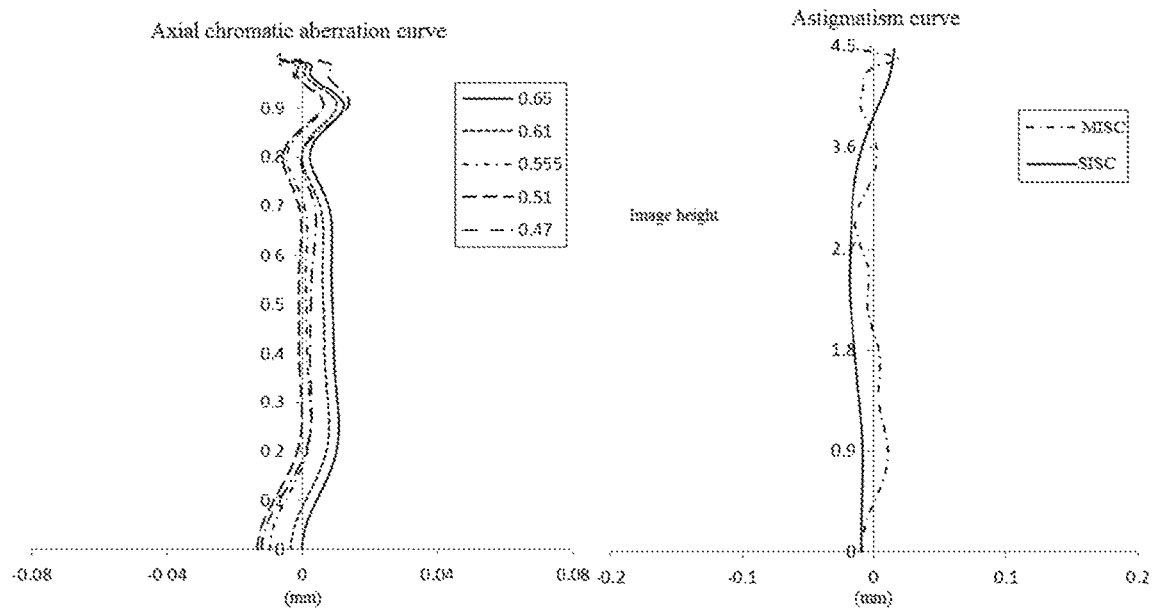
FIG. 10A to 10D show an axial chromatic aberration curve, an astigmatism curve, a distortion curve, and a magnification chromatic aberration curve, respectively, of the optical imaging system of embodiment 5.
Figures 10C, 10D:
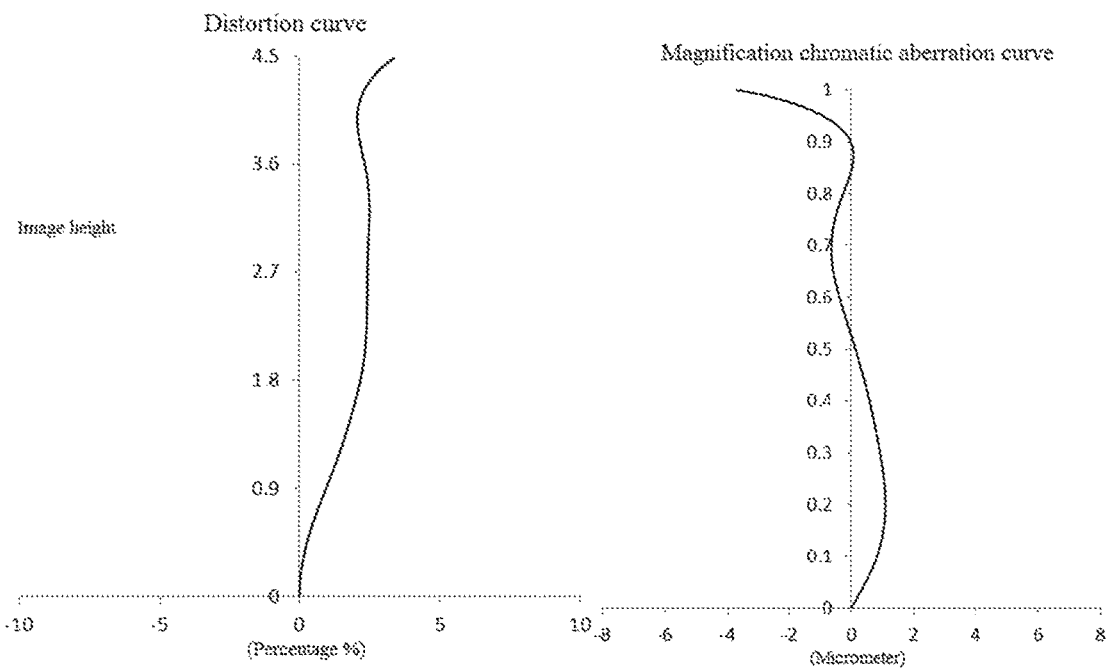

FIG. 10A shows an on-axis chromatic aberration curve of the optical imaging system of embodiment 5, and represents the deviation of the focal point of light rays of different wavelengths after passing through the system. FIG. 10B shows an astigmatism curve of the optical imaging system of embodiment 5, and represents a meridional image surface curvature and a sagittal image surface curvature. FIG. 10C shows a distortion curve of the optical imaging system of embodiment 5, and represents distortion magnitude values corresponding to different image heights. FIG. 10D shows a chromatic aberration of magnification curve of the optical imaging system of embodiment 5, and represents the deviation of different image heights on the imaging surface after the light passes through the system. As can be seen from FIG. 10A to 10D, the optical imaging system according to embodiment 5 can achieve good imaging quality.

Embodiment 6

Figure 11:
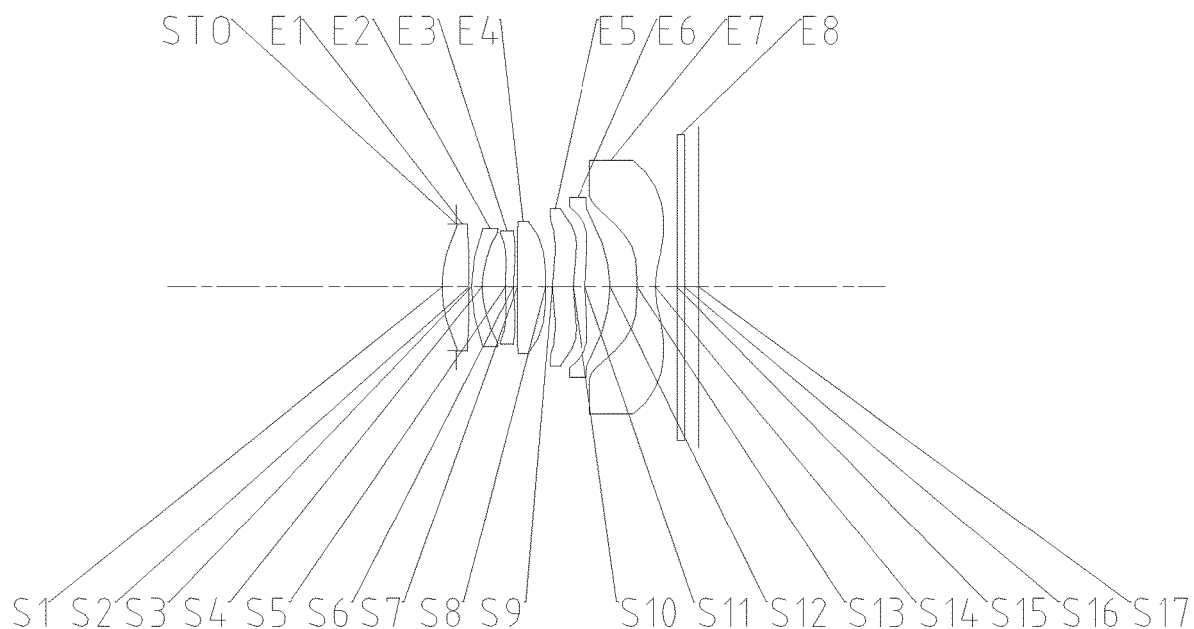
FIG. 11 shows a schematic structural diagram of an optical imaging system according to embodiment 6 of the present application.

An optical imaging system according to embodiment 6 of the present application is described below with reference to FIG. 11 to 12D. FIG. 11 shows a schematic configuration diagram of the optical imaging system according to embodiment 6 of the present application.

As shown in FIG. 11, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is a concave surface. The third lens E3 has negative refractive power, and the object side surface S5 is a convex surface and the image side surface S6 is a concave surface. The fourth lens E4 has positive refractive power, and the object side surface S7 and the image side surface S8 thereof are convex surfaces. The fifth lens E5 has positive refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a concave surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 6, the value of the effective focal length f of the optical imaging system is 5.18 mm, the value of the on-axis distance TTL from the object side surface S1 of the first lens E1 to the imaging plane S17 is 7.20 mm, the value of ImgH (half of the diagonal length of the effective pixel area on the imaging plane S17) is 4.48 mm, and the value of Semi-FOV (half of field of view) is 40.01 degrees.

Table 11 shows a basic parameter table of the optical imaging system of example 6, in which the units of the curvature radius, the thickness/distance, and the focal length are all millimeters (mm). Table 12 shows the coefficients of the high order terms that can be used for each aspherical mirror surface in embodiment 6, wherein each aspherical surface type can be defined by the formula (1) given in embodiment 1 described above.

TABLE 11

| Surface Number | Surface Type | Curvature Radius | Thickness/ Distance | Refractive Index | Dispersion Coefficient | Focal Length | Cone Coefficient |
|---|---|---|---|---|---|---|---|
| OBJ | Spherical surface | Infinity | Infinity | | | | |
| STO | Spherical surface | Infinity | −0.4015 | | | | |
| S1 | Aspheric surface | 3.6098 | 0.7563 | 1.55 | 56.11 | 6.40 | −0.2861 |
| S2 | Aspheric surface | −100.0000 | 0.0606 | | | | −90.4015 |
| S3 | Aspheric surface | 3.0643 | 0.2980 | 1.68 | 19.25 | −14.84 | 0.2002 |
| S4 | Aspheric surface | 2.2564 | 0.6582 | | | | 0.6820 |
| S5 | Aspheric surface | 9.3743 | 0.2200 | 1.68 | 19.25 | −24.15 | −1.0000 |
| S6 | Aspheric surface | 5.9035 | 0.1088 | | | | −96.3404 |
| S7 | Aspheric surface | 26.6606 | 0.7934 | 1.55 | 56.11 | 51.01 | 35.9458 |
| S8 | Aspheric surface | 618.3224 | 0.1871 | | | | −99.0000 |
| S9 | Aspheric surface | 2.9378 | 0.5907 | 1.55 | 56.11 | 22.42 | 0.6204 |
| S10 | Aspheric surface | 3.5912 | 0.3353 | | | | −5.4401 |
| S11 | Aspheric surface | 8.1337 | 0.7197 | 1.55 | 56.11 | 3.88 | −1.4922 |
| S12 | Aspheric surface | −2.7721 | 0.7525 | | | | −0.3484 |
| S13 | Aspheric surface | −20.5557 | 0.5000 | 1.54 | 55.74 | −3.42 | 55.4810 |
| S14 | Aspheric surface | 2.0362 | 0.6095 | | | | −1.0695 |
| S15 | Spherical surface | Infinity | 0.2100 | 1.52 | 64.17 | | |
| S16 | Spherical surface | Infinity | 0.4000 | | | | |
| S17 | Spherical surface | Infinity | | | | | |

TABLE 12

| Surface Number | A 4 | A 6 | A 8 | A 10 | A 12 | A 14 | A 16 | A 18 | A 20 |
|---|---|---|---|---|---|---|---|---|---|
| S1 | −3.3995E−04 | 8.1187E−03 | −2.0440E−02 | 2.7308E−02 | −2.1970E−02 | 1.0838E−02 | −3.2162E−03 | 5.2601E−04 | −3.6473E−05 |
| S2 | −3.2274E−02 | 8.5568E−02 | −1.2633E−01 | 1.2169E−01 | −7.8186E−02 | 3.2872E−02 | −8.6560E−03 | 1.2923E−03 | −8.3453E−05 |
| S3 | −7.8517E−02 | 9.9719E−02 | −1.3102E−01 | 1.2895E−01 | −8.9505E−02 | 4.2029E−02 | −1.2587E−02 | 2.1682E−03 | −1.6393E−04 |
| S4 | −7.1818E−02 | 3.2276E−02 | −3.3917E−02 | 3.9100E−02 | −4.1027E−02 | 2.9584E−02 | −1.3109E−02 | 3.2276E−03 | −3.3721E−04 |
| S5 | −3.5775E−02 | −4.4097E−02 | 8.4354E−02 | −1.1586E−01 | 1.0869E−01 | −6.7642E−02 | 2.6290E−02 | −5.6622E−03 | 5.1166E−04 |
| S6 | 3.9963E−02 | −1.2336E−01 | 1.5976E−01 | −1.5706E−01 | 1.1356E−01 | −5.7028E−02 | 1.8415E−02 | −3.3661E−03 | 2.6113E−04 |
| S7 | 9.2234E−03 | −1.5516E−02 | 7.5453E−04 | 8.2045E−03 | −4.7422E−03 | −5.6543E−05 | 7.8031E−04 | −2.3223E−04 | 2.1330E−05 |
| S8 | −9.9401E−02 | 7.4095E−02 | −6.3904E−02 | 4.1173E−02 | −1.9241E−02 | 6.6097E−03 | −1.6049E−03 | 2.3820E−04 | −1.5540E−05 |
| S9 | −1.2954E−01 | 5.8151E−02 | −2.3962E−02 | 4.1622E−04 | 5.0240E−03 | −2.5348E−03 | 5.8343E−04 | −6.5870E−05 | 2.9236E−06 |
| S10 | −4.3778E−02 | −2.6443E−02 | 4.8425E−02 | −3.9173E−02 | 1.7920E−02 | −4.9589E−03 | 8.2963E−04 | −7.8198E−05 | 3.2513E−06 |
| S11 | 4.3556E−03 | −3.5870E−02 | 2.9278E−02 | −1.2148E−02 | 1.9857E−03 | 1.3830E−04 | −9.8594E−05 | 1.3057E−05 | −5.6326E−07 |
| S12 | 4.1931E−02 | −2.9191E−02 | 1.4775E−02 | −2.5597E−03 | −8.1539E−04 | 4.4663E−04 | −7.8920E−05 | 6.2558E−06 | −1.8766E−07 |
| S13 | −8.5013E−02 | −5.2410E−03 | 2.3260E−02 | −1.4359E−02 | 4.8910E−03 | −1.0255E−03 | 1.3209E−04 | −9.5371E−04 | 2.9334E−07 |
| S14 | −1.1649E−01 | 3.9911E−02 | −1.0419E−02 | 1.9093E−03 | −2.4027E−04 | 2.0209E−05 | −1.0807E−06 | 3.3046E−08 | −4.3751E−10 |

FIG. 12A shows an on-axis chromatic aberration curve of the optical imaging system of embodiment 6, and represents a focus deviation of light rays of different wavelengths after passing through the system. FIG. 12B shows an astigmatism curve of the optical imaging system of embodiment 6, and represents a meridional image surface curvature and a sagittal image surface curvature. FIG. 12C shows a distortion curve of the optical imaging system of embodiment 6, and represents distortion magnitude values corresponding to different image heights. FIG. 12D shows a chromatic aberration of magnification curve of the optical imaging system of embodiment 6, and represents the deviation of different image heights on the imaging surface after the light passes through the system. As can be seen from FIG. 12A to 12D, the optical imaging system according to embodiment 6 can achieve good imaging quality.

Embodiment 7

An optical imaging system according to embodiment 7 of the present application is described below with reference to FIG. 13 to 14D. FIG. 13 shows a schematic configuration diagram of the optical imaging system according to embodiment 7 of the present application.

As shown in FIG. 13, the optical imaging system sequentially comprises the following components from an object side to an image side along an optical axis: a diaphragm STO, a first lens E1, a second lens E2, a third lens E3, a fourth lens E4, a fifth lens E5, a sixth lens E6, a seventh lens E7, and a filter E8.

The first lens E1 has positive refractive power, and the object side surface S1 and the image side surface S2 thereof are convex surfaces. The second lens E2 has negative refractive power, and the object side surface S3 is a convex surface and the image side surface S4 is concave surface. The third lens E3 has negative refractive power, and the object side surface S5 is a convex surface and the image side surface S6 is a concave surface. The fourth lens E4 has positive refractive power, and the object side surface S7 and the image side surface S8 thereof are convex surfaces. The fifth lens E5 has negative refractive power, and the object side surface S9 is a convex surface and the image side surface S10 is a concave surface. The sixth lens E6 has positive refractive power, and the object side surface S11 and the image side surface S12 thereof are convex surfaces. The seventh lens E7 has negative refractive power, and the object side surface S13 is a convex surface and the image side surface S14 is a concave surface. The filter E8 has an object side surface S15 and an image side surface S16. The optical imaging system has an imaging plane S17, and light from an object passes through each of the surfaces S1 to S16 in order and is finally imaged on the imaging plane S17.

In embodiment 7, the value of the effective focal length f of the optical imaging system is 5.15 mm, the value of the on-axis distance TTL from the object side surface S1 of the first lens E1 to the imaging plane S17 is 7.31 mm, the value of ImgH (half of the diagonal length of the effective pixel area on the imaging plane S17) is 4.28 mm, and the value of Semi-FOV (half of field of view) is 39.09 degrees.

Table 13 shows a basic parameter table of the optical imaging system of embodiment 7, in which the units of the curvature radius, the thickness/distance, and the focal length are all millimeters (mm). Table 14 shows the coefficients of the high order terms that can be used for each aspherical mirror surface in embodiment 7, wherein each aspherical surface type can be defined by the formula (1) given in embodiment 1 described above.

TABLE 13

| | | | | Materials | | | |
|---|---|---|---|---|---|---|---|
| Surface Number | Surface Type | Curvature Radius | Thickness/ Distance | Refractive Index | Dispersion Coefficient | Focal Length | Cone Coefficient |
| OBJ | Spherical surface | Infinity | Infinity | | | | |
| STO | Spherical surface | Infinity | −0.3360 | | | | |
| S1 | Aspheric surface | 4.1508 | 0.7690 | 1.55 | 56.11 | 6.05 | −0.6667 |
| S2 | Aspheric surface | −15.0774 | 0.0655 | | | | 15.1482 |

TABLE 13-continued

| Surface Number | Surface Type | Curvature Radius | Thickness/ Distance | Materials Refractive Index | Dispersion Coefficient | Focal Length | Cone Coefficient |
|---|---|---|---|---|---|---|---|
| S3 | Aspheric surface | 2.8203 | 0.2750 | 1.68 | 19.25 | −12.38 | 1.6013 |
| S4 | Aspheric surface | 2.0274 | 0.6611 | | | | −1.0234 |
| S5 | Aspheric surface | 7.5101 | 0.2535 | 1.68 | 19.25 | −19.73 | 0.1401 |
| S6 | Aspheric surface | 4.7429 | 0.0938 | | | | −97.1264 |
| S7 | Aspheric surface | 16.1386 | 0.9253 | 1.55 | 56.11 | 14.59 | −31.2490 |
| S8 | Aspheric surface | −15.4007 | 0.2735 | | | | 6.6334 |
| S9 | Aspheric surface | 3.1556 | 0.5115 | 1.55 | 56.11 | −72.31 | 0.7799 |
| S10 | Aspheric surface | 2.7548 | 0.3044 | | | | −7.4728 |
| S11 | Aspheric surface | 4.7151 | 0.7849 | 1.55 | 56.11 | 3.53 | 0.7541 |
| S12 | Aspheric surface | −3.0628 | 0.6222 | | | | −0.4224 |
| S13 | Aspheric surface | 561.9542 | 0.5000 | 1.54 | 55.74 | −3.41 | 99.0000 |
| S14 | Aspheric surface | 1.8215 | 0.6605 | | | | −1.0084 |
| S15 | Spherical surface | Infinity | 0.2100 | 1.52 | 64.17 | | |
| S16 | Spherical surface | Infinity | 0.3957 | | | | |
| S17 | Spherical surface | Infinity | | | | | |

TABLE 14

| Surface Number | A 4 | A 6 | A 8 | A 10 | A 12 | A 14 | A 16 | A 18 | A 20 |
|---|---|---|---|---|---|---|---|---|---|
| S1 | −4.7947E−04 | 5.7800E−03 | −1.3348E−02 | 1.6740E−02 | −1.3123E−02 | 6.4207E−03 | −1.9059E−03 | 3.1243E−04 | −2.1691E−05 |
| S2 | 9.6188E−03 | 2.0088E−02 | −4.6430E−02 | 4.9982E−02 | −3.3215E−02 | 1.3992E−02 | −3.6434E−03 | 5.3471E−04 | −3.3849E−05 |
| S3 | −6.5029E−02 | 7.5915E−02 | −1.3094E−01 | 1.5586E−01 | −1.2653E−01 | 6.7322E−02 | −2.2415E−02 | 4.2312E−03 | −3.4691E−04 |
| S4 | −6.5772E−02 | 6.4634E−02 | −8.6836E−02 | 1.0483E−01 | −9.4932E−02 | 5.8559E−02 | −2.2814E−02 | 5.0493E−03 | −4.8058E−04 |
| S5 | −4.8884E−02 | 7.8810E−03 | −2.6378E−02 | 4.8852E−02 | −5.2751E−02 | 3.3880E−02 | −1.2902E−02 | 2.7402E−03 | −2.5045E−04 |
| S6 | 6.2185E−02 | −1.5938E−01 | 1.9858E−01 | −1.7719E−01 | 1.1134E−01 | −4.7292E−02 | 1.2808E−02 | −1.9741E−03 | 1.3029E−04 |
| S7 | −2.3913E−03 | −3.2958E−03 | −8.7203E−03 | 1.5394E−02 | −9.5046E−03 | 2.8545E−03 | −3.9566E−04 | 1.2582E−05 | 1.4149E−06 |
| S8 | −6.7202E−02 | 4.0461E−02 | −2.3686E−02 | 8.0004E−03 | −7.7124E−04 | −3.7569E−04 | 1.3694E−04 | −1.7734E−05 | 8.8071E−07 |
| S9 | −1.2343E−01 | 4.2332E−02 | 2.6891E−03 | −1.7719E−02 | 1.1659E−02 | −3.9270E−03 | 7.4580E−04 | −7.5197E−05 | 3.1149E−06 |
| S10 | −5.1239E−02 | −2.7360E−02 | 4.8313E−02 | −3.3931E−02 | 1.3188E−02 | −3.0110E−03 | 3.9452E−04 | −2.6499E−05 | 6.6805E−07 |
| S11 | 9.8263E−03 | −3.7971E−02 | 2.1013E−02 | −3.4135E−03 | −1.9585E−03 | 1.0894E−03 | −2.2841E−04 | 2.2801E−05 | −8.8870E−07 |
| S12 | 6.3938E−02 | −3.6890E−02 | 1.2678E−02 | 6.6753E−04 | −2.2843E−03 | 8.8706E−04 | −1.2313E−04 | 9.3488E−06 | −2.8038E−07 |
| S13 | −8.3052E−02 | −1.4144E−02 | 2.4790E−02 | −1.1887E−02 | 3.1640E−03 | −4.9895E−04 | 4.6689E−05 | −2.4275E−06 | 5.4726E−08 |
| S14 | −1.3161E−01 | 4.4486E−02 | −1.1339E−02 | 2.0204E−03 | −2.4422E−04 | 1.9502E−05 | −9.8460E−07 | 2.8487E−08 | −3.6027E−10 |

Figures 14C, 14D:
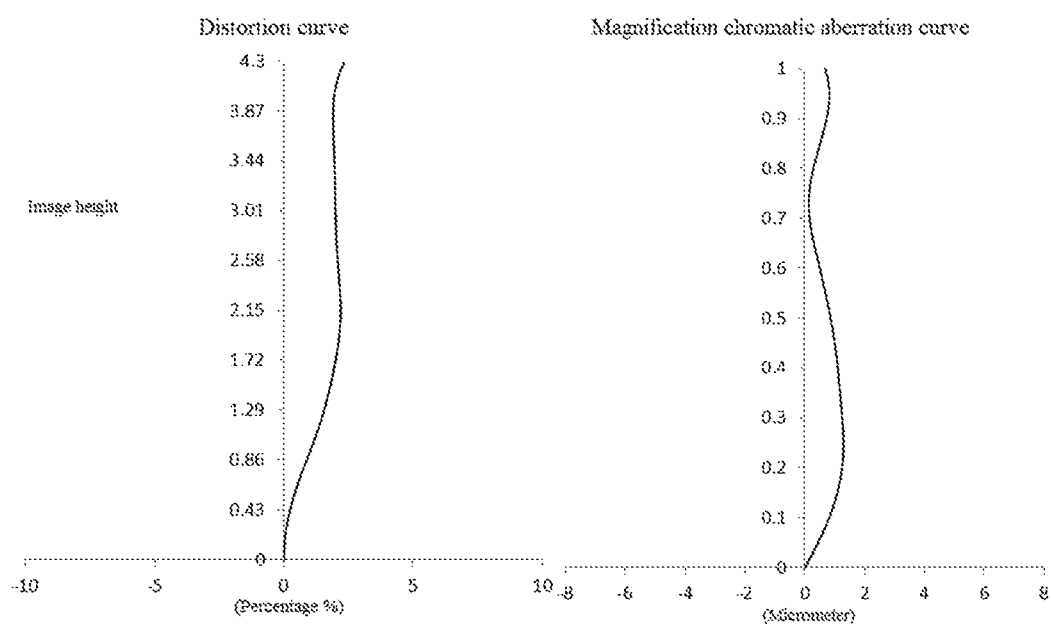

FIG. 14A shows an on-axis chromatic aberration curve of the optical imaging system of embodiment 7, and represents a focus deviation of light rays of different wavelengths after passing through the system. FIG. 14B shows an astigmatism curve of the optical imaging system of embodiment 7, and represents a meridional image surface curvature and a sagittal image surface curvature. FIG. 14C shows a distortion curve of the optical imaging system of embodiment 7, and represents distortion magnitude values corresponding to different image heights. FIG. 14D shows a chromatic aberration of magnification curve of the optical imaging system of example 7, and represents the deviation of different image heights on the imaging surface after the light passes through the system. As can be seen from FIG. 14A to 14D, the optical imaging system according to embodiment 7 can achieve good imaging quality.

In summary, each of embodiments 1 to 7 satisfies the relationship shown in table 15.

TABLE 15

| Conditional expression embodiment | 1 | 2 | 3 | 4 | 5 | 6 | 7 |
|---|---|---|---|---|---|---|---|
| f/EPD | 1.42 | 1.44 | 1.46 | 1.42 | 1.43 | 1.46 | 1.43 |
| f/|f1 + f2| | 0.83 | 1.05 | 0.68 | 0.62 | 0.51 | 0.61 | 0.81 |

TABLE 15-continued

| Conditional expression embodiment | 1 | 2 | 3 | 4 | 5 | 6 | 7 |
|---|---|---|---|---|---|---|---|
| tan(Semi-FOV) × \|f6\| (mm) | 2.48 | 2.74 | 3.27 | 3.00 | 2.61 | 3.25 | 2.87 |
| ImgH/f12 | 0.45 | 0.47 | 0.46 | 0.45 | 0.46 | 0.46 | 0.43 |
| f/R2 | −0.43 | −0.26 | −0.05 | −0.17 | −0.15 | −0.05 | −0.34 |
| T12/T34 | 0.62 | 0.69 | 0.82 | 0.39 | 0.27 | 0.56 | 0.70 |
| T23/(CT2 + CT3) | 1.02 | 1.38 | 1.35 | 1.30 | 1.24 | 1.27 | 1.25 |
| (CT1 + CT4 + CT6)/Σ CT | 0.62 | 0.64 | 0.57 | 0.60 | 0.65 | 0.59 | 0.62 |
| TTL/(R5 + R6) | 0.57 | 0.45 | 0.41 | 0.65 | 0.81 | 0.47 | 0.60 |
| R9/R11 | 0.73 | 0.62 | 0.37 | 0.52 | 0.71 | 0.36 | 0.67 |
| CT1/CT4 | 0.94 | 0.84 | 1.05 | 0.80 | 0.75 | 0.95 | 0.83 |
| SAG12/SAG42 | 0.34 | 0.12 | 0.11 | 0.22 | 0.25 | 0.11 | 0.21 |

The present application further provides an imaging device provided with an electronic photosensitive element for imaging, and the electronic photosensitive element of the device may be a photosensitive coupling (CCD) element or a complementary metal oxide semiconductor (CMOS) element. The imaging device may be a stand-alone imaging device such as a digital camera, or an imaging module integrated on a mobile electronic device such as a cellular phone. The imaging device is equipped with the optical imaging system described above.

The above description is only illustrative of the preferred embodiments of the present application and the principles of the technology employed. It should be understood by those skilled in the art that the scope of protection referred to in the present application is not limited to the technical scheme of the specific combination of features described above, and other technical schemes of formed by any combination of the features described above or their equivalents may be covered without departing from the spirit of the present application. For example, the above features may be replaced with (but not limited to) features having similar functions disclosed in the present application.

The invention claimed is:

1. An optical imaging system is characterized by sequentially comprising the following components from an object side to an image side along an optical axis:
   a first lens having refractive power, an image side surface of which is a convex surface;
   a second lens having negative refractive power;
   a third lens having refractive power, the image side surface of which is a concave surface;
   a fourth lens having refractive power, a radius curvature of an image side surface of the fourth lens being a negative value;
   a fifth lens having refractive power, the object side surface of which is a convex surface;
   a sixth lens with positive refractive power, the object side surface of which is a convex surface;
   a seventh lens having refractive power,
   wherein an effective focal length f of the optical imaging system and an entrance pupil diameter EPD of the optical imaging system meet the condition that f/EPD is less than 2.5,
   wherein the effective focal length f of the optical imaging system, an effective focal length f1 of the first lens, and an effective focal length f2 of the second lens satisfy 0.1<f/|f1+f2|<1.5,
   wherein Semi-FOV (half of field of view) of the optical imaging system and an effective focal length f6 of the sixth lens satisfy 2.48 mm≤tan (Semi-FOV)×|f6|<3.6 mm, and
   wherein an on-axis distance SAG12 from an intersection of the image side surface of the first lens and the optical axis to an effective radius vertex of the image side surface of the first lens and an on-axis distance SAG42 from an intersection of the image side surface of the fourth lens and the optical axis to an effective radius vertex of the image side surface of the fourth lens satisfy 0<SAG12/SAG42<0.5.

2. The optical imaging system of claim 1, wherein ImgH (half of a diagonal length of an effective pixel area on an imaging plane) of the optical imaging system and a combined focal length f12 of the first lens and the second lens satisfy 0.3<ImgH/f 12<0.6.

3. The optical imaging system of claim 1, wherein an effective focal length f of the optical imaging system and a curvature radius R2 of an image side surface of the first lens satisfy −0.43 f/R2<0.

4. The optical imaging system of claim 1, wherein a space distance T12 between the first lens and the second lens on the optical axis and a space distance T34 between the third lens and the fourth lens on the optical axis satisfy 0<T12/T34<0.9.

5. The optical imaging system of claim 1, wherein a space distance between the second lens and the third lens on the optical axis T23, a center thickness CT2 of the second lens on the optical axis, and a center thickness CT3 of the third lens on the optical axis satisfy 1.02≤T23/(CT2+CT3)<1.6.

6. The optical imaging system of claim 1, wherein a center thickness CT1 of the first lens on the optical axis, a center thickness CT4 of the fourth lens on the optical axis, a center thickness CT6 of the sixth lens on the optical axis, and a sum of center thicknesses ΣCT of the first lens to the seventh lens on the optical axis satisfy 0.3<(CT1+CT4+CT6)/ΣCT<0.8.

7. The optical imaging system of claim 1, wherein a distance TTL from the first lens to an imaging surface of the optical imaging system on the optical axis, a curvature radius R5 of an object side surface of the third lens, and a curvature radius R6 of an image side surface of the third lens satisfy 0.2<TTL/(R5+R6)<1.

8. An optical imaging system is characterized by sequentially comprising the following components from an object side to an image side along an optical axis:
   a first lens having refractive power, an image side surface of which is a convex surface;
   a second lens having negative refractive power;
   a third lens having refractive power;
   a fourth lens having refractive power, a radius curvature of an image side surface of the fourth lens being a negative value;
   a fifth lens having refractive power, the object side surface of which is a convex surface;

a sixth lens having refractive power, the object side surface of which is a convex surface;

a seventh lens having refractive power;

wherein an effective focal length f of the optical imaging system and an entrance pupil diameter EPD of the optical imaging system meet the condition that f/EPD is less than 1.5, wherein Semi-FOV (half of field of view) of the optical imaging system and an effective focal length f6 of the sixth lens satisfy 2.48 mm≤tan (Semi-FOV)×|f6|<3.6 mm, and wherein an on-axis distance SAG12 from an intersection of the image side surface of the first lens and the optical axis to an effective radius vertex of the image side surface of the first lens and an on-axis distance SAG42 from an intersection of the image side surface of the fourth lens and the optical axis to an effective radius vertex of the image side surface of the fourth lens satisfy 0<SAG12/SAG42<0.5.

* * * * *